United States Patent
Van Allen

[19]

[11] Patent Number: 6,101,213
[45] Date of Patent: Aug. 8, 2000

[54] METHOD SYSTEM AND COMPUTER PROGRAM PRODUCT FOR SPREAD SPECTRUM COMMUNICATION USING CIRCULAR WAVEFORM SHIFT-KEYING

[75] Inventor: Russell N. Van Allen, Crofton, Md.

[73] Assignee: Glynn Scientific, Inc., Annapolis, Md.

[21] Appl. No.: 08/821,558

[22] Filed: Mar. 21, 1997

[51] Int. Cl.[7] .............................. H04B 15/00; H04K 1/00; H04L 27/30

[52] U.S. Cl. ........................ 375/130; 375/201; 375/202; 375/203; 375/206; 375/272; 375/303; 375/334; 329/300; 332/100

[58] Field of Search .................................... 375/200, 201, 375/202, 203, 206, 208, 209, 210, 272, 303, 334; 329/300; 332/100

[56] References Cited

U.S. PATENT DOCUMENTS

| | | | |
|---|---|---|---|
| 4,527,275 | 7/1985 | Russell | 375/1 |
| 4,561,089 | 12/1985 | Rouse et al. | 370/18 |
| 4,707,839 | 11/1987 | Andren et al. | 375/1 |
| 5,029,184 | 7/1991 | Andren et al. | 375/203 |
| 5,103,459 | 4/1992 | Gilhousen et al. | 370/206 |
| 5,132,986 | 7/1992 | Endo et al. | 375/1 |
| 5,155,741 | 10/1992 | Waters et al. | 375/1 |
| 5,204,877 | 4/1993 | Endo et al. | 375/1 |
| 5,291,515 | 3/1994 | Uchida et al. | 375/1 |
| 5,313,457 | 5/1994 | Hostetter et al. | 370/18 |
| 5,450,395 | 9/1995 | Hostetter et al. | 370/320 |
| 5,469,469 | 11/1995 | Haines | 375/201 |
| 5,471,509 | 11/1995 | Wood et al. | 375/350 |
| 5,557,637 | 9/1996 | Glynn | 375/271 |

FOREIGN PATENT DOCUMENTS

WO 95/12939  5/1995  WIPO .............................. H04L 9/00

OTHER PUBLICATIONS

*Electronic Engineering Times*, entitled Part 2: Digital Cellular Communications Design, by Loring Wirberl and Sam Weber, May 27, 1996, pp. 73–74, 76, 78, 80, 84, 85, 88, 90, 92, 96, 100 & 104.

*Telecommunications Technology Handbook*, by D. Minoli (Artech House, Boston, Ma. 1991), pp. 323–333.

Primary Examiner—Stephen Chin
Assistant Examiner—Michael W. Maddox
Attorney, Agent, or Firm—Antonelli, Terry, Stout & Kraus, LLP

[57] ABSTRACT

A method, system, and computer program product for spread spectrum communication is provided using circular waveform shift-keying (CWSK). Circular waveform shift-keying is a modulation technique for conveying data over a spread spectrum channel. Data symbols are encoded in a circular time shift and/or circular frequency shift of a spread spectrum waveform. In a receiver, a CWSK synchronization stage and demodulator stage can be combined on a single fast convolution ASIC chip. Using CWSK modulation and demodulation, a secure, low-cost terminal is realized that can process calls on multiple spread spectrum channels in a hubless wireless network linking large numbers of low data rate users.

53 Claims, 19 Drawing Sheets

METHOD SYSTEM AND COMPUTER PROGRAM PRODUCT FOR SPREAD SPECTRUM COMMUNICATION USING CIRCULAR WAVEFORM SHIFT-KEYING

BACKGROUND OF THE INVENTION

1. Field of the Invention

The present invention is related to data communication in spread spectrum systems and applications.

2. Related Art

Spread spectrum techniques have become increasingly important in both commercial and military communication, navigation, and test systems. In a spread spectrum system, a transmitted signal is "spread" over a wider frequency band than the minimum bandwidth required to transmit the data being sent. For example, a carrier (or baseband) signal with a bandwidth of a few kilohertz is distributed over a wider bandwidth of several megahertz.

In direct sequence spread spectrum systems, data symbols are conveyed by directly modulating the digital code sequence of a wideband carrier waveform signal. These digital codes are usually phase modulation sequences that have a chip rate much higher than the information bandwidth of the data signal.

Different types of modulation are used to convey data symbols over a spread spectrum channel in direct sequence spread spectrum systems. Two common types of modulation are phase-shift-keying and frequency-shift keying. In phase-shift keying (PSK) the phase of a carrier signal in the time-domain is modulated to represent a data symbol. Different types of phase-shift keying include binary phase-shift keying (BPSK), quadriphase-shift keying (QPSK), and multi-level M-ary phase-shift keying. Frequency-shift keying (FSK) modulates a carrier waveform signal by different frequencies representative of respective data symbols. For example, in binary FSK, the choice of one of two frequencies is used to represent either a zero or a one. See, e.g., Robert C. Dixon, *Spread Spectrum Systems with Commercial Applications*, 3rd. Ed. (John Wiley & Sons, Inc.: 1994), incorporated in its entirety herein by reference.

Wireless communication networks have adopted spread spectrum techniques. For example, satellite networks support multiple spread spectrum channels linking multiple terminals. Conventional direct sequence modulation techniques, however, can require expensive analog hardware driving up the cost of terminal equipment. Receiver costs are increased further as direct code sequences become more complicated to protect against interference, to provide privacy, and to reduce noise. Hub networks which require a central control station are sometimes required to coordinate communication.

What is needed is a new form of data modulation for conveying data over a spread spectrum channel.

SUMMARY OF THE INVENTION

A method, system, and computer program product for spread spectrum communication is provided using circular waveform shift-keying (CWSK). Circular waveform shift-keying is a modulation technique for conveying data over a spread spectrum channel. In CWSK modulation, data symbols are encoded in the circular shift of the spread spectrum waveform. CWSK modulation can be time-shifted and/or frequency-shifted. In time-shifted CWSK modulation (CWSK-T), data symbols are encoded in a circular time shift of the spread spectrum waveform. In frequency-shifted CWSK modulation (CWSK-F), data symbols are encoded in a circular frequency shift of the spread spectrum waveform. In time-shifted and frequency-shifted CWSK modulation (CWSK-T/F or CWSK F/T), data symbols are encoded in a circular time shift and a circular frequency shift of the spread spectrum waveform. Any type of digital data can be encoded using CWSK modulation. Synch symbols and track symbols can also be encoded using CWSK modulation.

According to the present invention, a terminal includes a transmitter and a receiver. The transmitter includes a CWSK modulator for performing CWSK-T, CWSK-F, CWSK-T/F, or CWSK F/T modulation. The receiver includes a CWSK demodulator for performing corresponding CWSK-T, CWSK-F, CWSK-T/F, or CWSK F/T demodulation.

According to a first aspect of the present invention, time-shifted CWSK modulation (CWSK-T) is provided where data symbols are encoded in a circular time shift of the spread spectrum waveform. In one embodiment, a CWSK-T modulator and demodulator are provided. To transfer data, the transmitter transmits a time-shifted CWSK data waveform. Data symbols are encoded by a circular time-shift of a spread spectrum waveform within each frame.

The receiver receives and demodulates the spread spectrum CWSK-T data waveform sent by a transmitter to extract the modulated data. The receiver includes a CWSK-T demodulator that performs at least one convolution operation between a frame in the transmitted spread spectrum CWSK-T data waveform and a stored replica to detect a location of a convolution peak within a frame. The detected convolution peak location within a frame represents the data symbol.

According to one CWSK-T demodulator embodiment, the receiver collects a frame of the time-shifted CWSK data waveform. A CWSK-T demodulator performs a Fast Fourier Transform on the collected frame to obtain a frequency-domain signal representative of the received CWSK data waveform frame. The CWSK-T demodulator multiplies the frequency-domain signal with a replica spectrum and provides a product output signal representative thereof. The replica spectrum represents a Fast Fourier Transform of a time-domain replica of a frame of the transmitted spread spectrum CWSK waveform. The CWSK-T demodulator performs an inverse Fast Fourier Transform on a product output signal to obtain the time-domain convolution result. This time-domain signal contains a time bin indicative of the data symbol in the collected frame. In one embodiment, the CWSK-T demodulator would output the data associated with the time bin of largest magnitude in power.

According to a further feature of the present invention, time-shifted circular-waveform shift-keying allows a spread spectrum receiver to be realized such that a synchronizing stage and a demodulator stage are implemented in software, firmware, hardware, and any combination thereof. In one example, a CWSK-T demodulator can be implemented primarily in software only, with little or no change to existing hardware.

In another example CWSK-T embodiment, a receiver includes a fast convolution module and a controller for switching the fast convolution module between a synchronization mode and a demodulation mode for each spread spectrum channel. The fast convolution module is fabricated as a single fast convolution ASIC chip. In one example, the fast convolution ASIC chip includes a complex sample buffer, a complex replica buffer, a fast convolution processor, and a real convolution buffer. The fast convolution processor is a dual Fast Fourier Transform (FFT) processor. The fast convolution processor performs the following operations for CWSK-T demodulation: an N-point complex forward FFT, N-point complex multiply, N-point complex inverse FFT, and N-point complex magnitude squared.

The fast convolution ASIC can be operated in two modes, acquisition and demodulation. The acquisition mode at 1024-points is used for CWSK synchronization. The demodulation mode at 256-points is used for CWSK demodulation. In this way, a CWSK-T demodulator is implemented primarily in a single integrated chip at a receiver terminal. Only one fast convolution ASIC is needed at a receiver terminal for CWSK-T demodulation. A low-cost receiver is realized that uses a single fast convolution ASIC to process four spread spectrum channels.

According to a second aspect of the present invention, frequency-shifted CWSK modulation (CWSK-F) is provided where data symbols are encoded in a circular frequency shift of the spread spectrum waveform. In one embodiment, a CWSK-F modulator and demodulator are provided. In a demodulation mode, the transmitter transmits a frequency-shifted CWSK data waveform.

The receiver receives and demodulates the spread spectrum CWSK-F data waveform sent by a transmitter to extract the modulated data. The receiver includes a CWSK-F demodulator that performs at least one convolution operation between a frame in the transmitted spread spectrum CWSK-F data waveform and a stored replica to detect a location of a convolution peak within a frame. The detected convolution peak location within a frame represents the data symbol.

According to one CWSK-F embodiment, in demodulation mode the receiver collects a frame of the frequency-shifted CWSK-F data waveform. The receiver multiplies the time-domain signal with a replica signal and provides a product output signal representative thereof. The replica waveform represents a time-domain replica of a frame of the transmitted spread spectrum CWSK-F waveform. The receiver performs a Fast Fourier Transform on a product output signal to obtain the frequency-domain convolution output. The frequency-domain signal contains a frequency bin indicative of the data symbol in the collected frame. In one embodiment, the CWSK-F demodulator would output the data associated with the frequency bin of largest magnitude in power. Thus, receiver processing for CWSK-F is simpler than that for CWSK-T, as only one Fast Fourier Transform type operation is performed.

According to a further feature of the present invention, frequency-shifted circular-waveform shift-keying allows a spread spectrum receiver to be realized such that a synchronizing stage and a demodulator stage are implemented in software, firmware, hardware, and any combination thereof. In one example, a CWSK-F demodulator can be implemented primarily in software only with little or no change to existing hardware.

In another example, a CWSK-F demodulator includes a fast convolution module and a controller for switching the fast convolution module between a synchronization mode and a demodulation mode for each spread spectrum channel. The fast convolution module is fabricated as a single fast convolution ASIC chip. The fast convolution ASIC chip includes a complex sample buffer, a complex replica buffer, a fast convolution processor, and a real convolution buffer. The fast convolution processor is a Fast Fourier Transform (FFT) processor. The fast convolution processor performs the following operations for CWSK-F demodulation: an N-point complex multiply, N-point complex FFT, and N-point complex magnitude squared.

According to a third aspect of the present invention, time-shifted and frequency-shifted CWSK modulation (CWSK-T/F) is provided where data symbols are encoded in two-dimensions, that is, by a circular time shift and a circular frequency shift of the spread spectrum waveform within each frame. In one embodiment, a CWSK-T/F modulator and demodulator are provided. To transfer data, a CWSK-T/F modulator transmits a time-shifted and frequency-shifted CWSK data waveform. For example, eight-bit CWSK modulation in each of time and frequency domains provides a total of sixteen bits per symbol, and total of 65,536 unique time/frequency data points (256 time bins by 256 frequency bins).

In another feature of the present invention, CWSK-F and CWSK-T are multiplexed on the same spread spectrum channel. For example, CWSK-T modulation can be used for voice data and CWSK-F modulation can be used for data. In another feature of the present invention, two-dimensional CWSK can be used for a high-capacity synchronous spread spectrum channel. All users share the same spread spectrum code but use different blocks of time-frequency bins to transmit receive data. This embodiment has the advantage that the auto-correlation of a spread spectrum waveform can be lower than the cross correlation between different ones.

Two types of two-dimensional CWSK demodulators (CWSK-T/F and CWSK-F/T) are provided. In a CWSK-T/F demodulation embodiment, a CWSK-T/F demodulator repeats CWSK-T demodulation for multiple frequency bins. In demodulation mode, a receiver collects a frame of the CWSK-T/F data waveform. The CWSK-T/F demodulator performs a Fast Fourier Transform on the collected frame to obtain a frequency-domain signal representative of the received CWSK-T/F data waveform frame. The CWSK-T/F demodulator multiplies the frequency-domain signal by one replica of a set of circularly frequency-shifted replica spectrums associated with possible frequency data bins. The CWSK-T/F demodulator then performs an inverse Fast Fourier Transform on the multiplicative result to produce a time domain convolution output. This process is then repeated for each replica of the set of circularly-shifted frequency replicas representing the range of possible frequency data bins. The collection of time domain convolution outputs across the set of frequency replicas contains the time-frequency bin indicative of the CWSK-T/F encoded data symbol. In one embodiment, the CWSK-T/F demodulator would output the data associated with the time-frequency bin of largest power.

In a CWSK-F/T demodulation embodiment, a CWSK-F/T demodulator repeats CWSK-F demodulation for multiple time bins. In demodulation mode, a receiver collects a frame of the CWSK-F/T data waveform. The CWSK-F/T demodulator multiplies the frequency-domain signal by a set of circularly time-shifted replicas associated with possible time data bins. This replica multiplication produces a corresponding set of time bins. The CWSK-F/T demodulator then performs a Fast Fourier Transform on the set of time bins to produce a frequency domain convolution output. This process is then repeated for each replica of the set of circularly-shifted time replicas representing the range of possible time data bus. The collection of frequency domain convolution outputs across the set of time replicas contains the frequency-time bin indicative of the CWSK-F/T encoded data symbol. In one embodiment, the demodulator would choose encoded data symbol.

According to a further feature of the present invention, time-shifted and frequency-shifted circular-waveform shift-keying allows a spread spectrum receiver to be realized such that a synchronizing stage and a demodulator stage are implemented in software, firmware, hardware, and any combination thereof. Both a CWSK-T/F demodulator and a CWSK-F/T demodulator can be implemented primarily in software only with little or no change to existing hardware. In another example, a CWSK-T/F demodulator can be implemented primarily in one fast convolution ASIC at a receiver terminal for CWSK-T/F demodulation and tracking. Likewise, in another example, a CWSK-F/T demodulator can be implemented primarily in one fast convolution ASIC at a receiver terminal for CWSK-F/T demodulation and tracking.

According to another feature of the present invention, a transmitter and receiver are first synchronized prior to transferring one-dimensional or two-dimensional CWSK modulated data (CWSK-T, CWSK-F, CWSK-T/F, or CWSK F/T data waveforms). In a synchronization mode, the transmitter transmits a CWSK synch waveform having a synch symbol. The synch symbol can be the unmodulated spread spectrum waveform. The receiver synchronizes the receiver terminal to the CWSK synch waveform. For example, the receiver performs a fast convolution operation between a frame in the transmitted spread spectrum CWSK synch waveform and a stored replica to detect a convolution peak. The location of the convolution peak corresponds to the synch symbol. The unmodulated spread spectrum carrier can also be a CWSK symbol, such as, a zero. Also, any CWSK modulated symbol can be used as CWSK synch symbol where the synch symbol is encoded by a circular time-shift of a spread spectrum waveform within a frame.

In one example, the receiver can be operated in a synchronization mode that collects N consecutive frames of the transmitted spread spectrum CWSK waveform, where N is an integer and performs N fast convolutions between the N frames and a stored replica of a frame of the transmitted spread spectrum CWSK waveform to detect N convolution peaks. The synchronization stage integrates N detected convolution peaks and outputs an output signal representative thereof. A CFAR threshold criterion is then applied to detect when the output signal exceeds a predetermined threshold indicating a synch has been detected. The receiver terminal then shifts a time reference signal based on the detected synch symbol to synch the receiver terminal to transmitted frames.

Repeating the CWSK synch waveform from frame to frame allows fast convolution processing to acquire and synchronize no matter what the timing mismatch is between the transmitter and receiver. The receiver frame can straddle two different transmitter frames, but a circular convolution matches both waveform sections together within each repeated frame.

According to another feature of the present invention, CWSK demodulation (CWSK-T, CWSK-F, CWSK-T/F, or CWSK F/T demodulator embodiments) can be operated in CWSK demodulation mode and tracking mode in parallel. A receiver can be switched to a track mode. Tracking measurements can be made based on demodulated data symbols with different tracking replicas to maintain a time window and to compensate for any frequency shift in frames being transmitted and received. Alternatively, a transmitter can transmit a spread spectrum CWSK waveform having a known track symbol encoded by circular-waveform shift-keying (CWSK-T, CWSK-F, CWSK-T/F, or CWSK F/T). CWSK encoded track symbols are then demodulated like CWSK encoded data symbols.

One-dimensional and two-dimensional CWSK modulation, according to the present invention, is applicable to any direct sequence spread spectrum waveform. CWSK is non-coherent and does not require stringent phase noise control. CWSK is easily implemented at relatively low cost in a digital signal processor and/or application specific integrated circuit (ASIC). CWSK is scalable to provide access to a large number of uncoordinated users.

Secure, inexpensive data communication over one or more spread spectrum channels between transmitter and receiver terminals in a satellite network is provided using CWSK modulation and CWSK demodulation to encode and decode data symbols. In a receiver, a CWSK synchronization stage and demodulator stage can be combined on a single chip. Using CWSK modulation and demodulation, a low-cost terminal is realized that can process calls on multiple spread spectrum channels in a hubless network linking large numbers of low data rate users.

Further aspects, features, and advantages of the present invention, as well as the structure and operation of various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention.

FIG. 3A shows processing of a CWSK synch waveform. FIG. 3B shows processing of a CWSK-T data waveform.

The present invention is described with reference to the accompanying drawings. In the drawings, like reference numbers indicate identical or functionally similar elements. Additionally, the left-most digit(s) of a reference number identifies the drawing in which the reference number first appears.

Figure 1A:
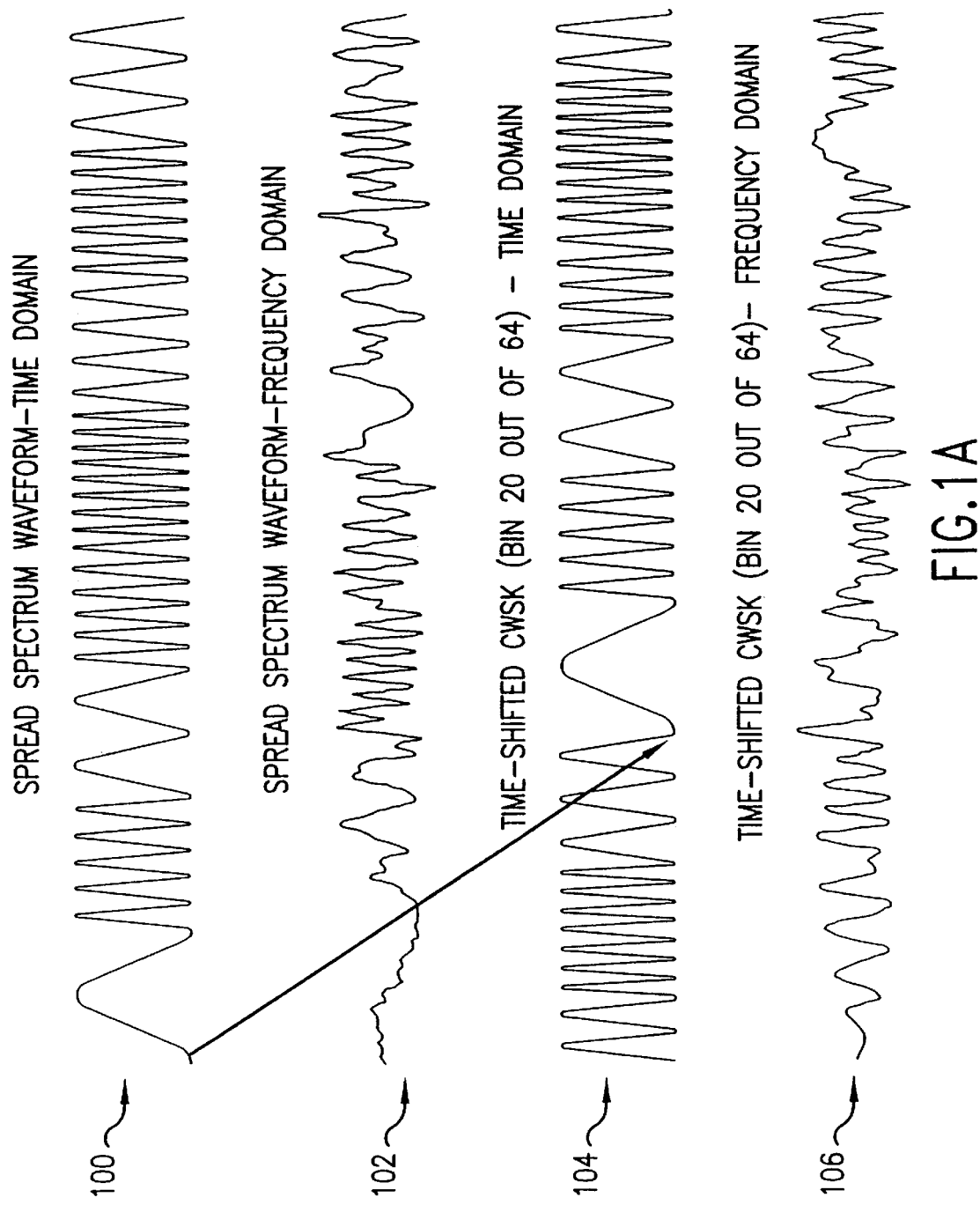
FIG. 1A is a diagram of a spread spectrum waveform with one-dimensional CWSK-T modulation according to the present invention.

Detailed Description of the Preferred Embodiments
1. Overview and Terminology

The present invention provides a modulation technique for conveying data over one or more spread spectrum channels. This modulation technique is called circular waveform shift-keying (CWSK). Data symbols are encoded in a circular time shift and/or a circular frequency shift of a spread spectrum waveform. The time-bandwidth product of the spread spectrum carrier signal provides the resolution for distinguishing data symbols in time and/or frequency. Circular convolution of a received CWSK signal with the unmodulated base waveform yields a peak at the proper circular shift corresponding to the data being transmitted.

The terms circular waveform shift-keying, CWSK, CWSK modulation, and equivalents thereof, are used interchangeably to refer to a new data modulation technique provided in the present invention. In circular waveform shift keying, data symbols are encoded in a circular time shift and/or a circular frequency shift of any direct sequence spread spectrum waveform. CWSK modulation can be time-shifted and/or frequency-shifted.

CWSK modulation/demodulation can be one-dimensional or two-dimensional. One-dimensional CWSK refers to time-shifted or frequency-shifted CWSK modulation/demodulation (CWSK-T or CWSK-F). Time-shifted CWSK, CWSK-T, and equivalents thereof, are used interchangeably to refer to a time-shifted CWSK modulation where data symbols are encoded in a circular time shift of a direct sequence spread spectrum waveform. Frequency-shifted CWSK modulation, CWSK-F, and equivalents thereof, are used interchangeably to refer to a frequency-shifted CWSK modulation where data symbols are encoded in a circular frequency shift of a direct sequence spread spectrum waveform.

Two-dimensional CWSK refers to time-shifted and frequency-shifted CWSK modulation/demodulation (CWSK-T/F and CWSK-F/T). Time-shifted and frequency-shifted CWSK modulation, CWSK-T/F modulation, and CWSK-F/T modulation, and equivalents thereof, are used to refer to a time-shifted and frequency-shifted CWSK modulation where data symbols are encoded in a circular time shift and a circular frequency shift of a direct sequence spread spectrum waveform. CWSK-T/F demodulation refers to an embodiment where a CWSK demodulator repeats CWSK-T demodulation for multiple frequency bins. CWSK-F/T demodulation refers to an embodiment where a CWSK demodulator repeats CWSK-F demodulation for multiple time bins.

"Wireless network," and equivalents thereof, refer to any communication network having a wireless communication link between terminals. A wireless network can include, but is not limited to, a satellite network, personal communication network (PCN), and/or a cellular network. The wireless communication link can be any type of wireless link including, but not limited to, a satellite link, and a microwave, optical, infra-red and/or radio link.

2. Example Environment

The present invention is described in terms of an example wireless communications environment. Description in these terms is provided for convenience only. It is not intended that the invention be limited to application in this example environment. In fact, after reading the following description, it will become apparent to a person skilled in the relevant art how to implement the invention in alternative environments.

3. Data Communication using CWSK Modulation and Demodulation

Figure 1B:
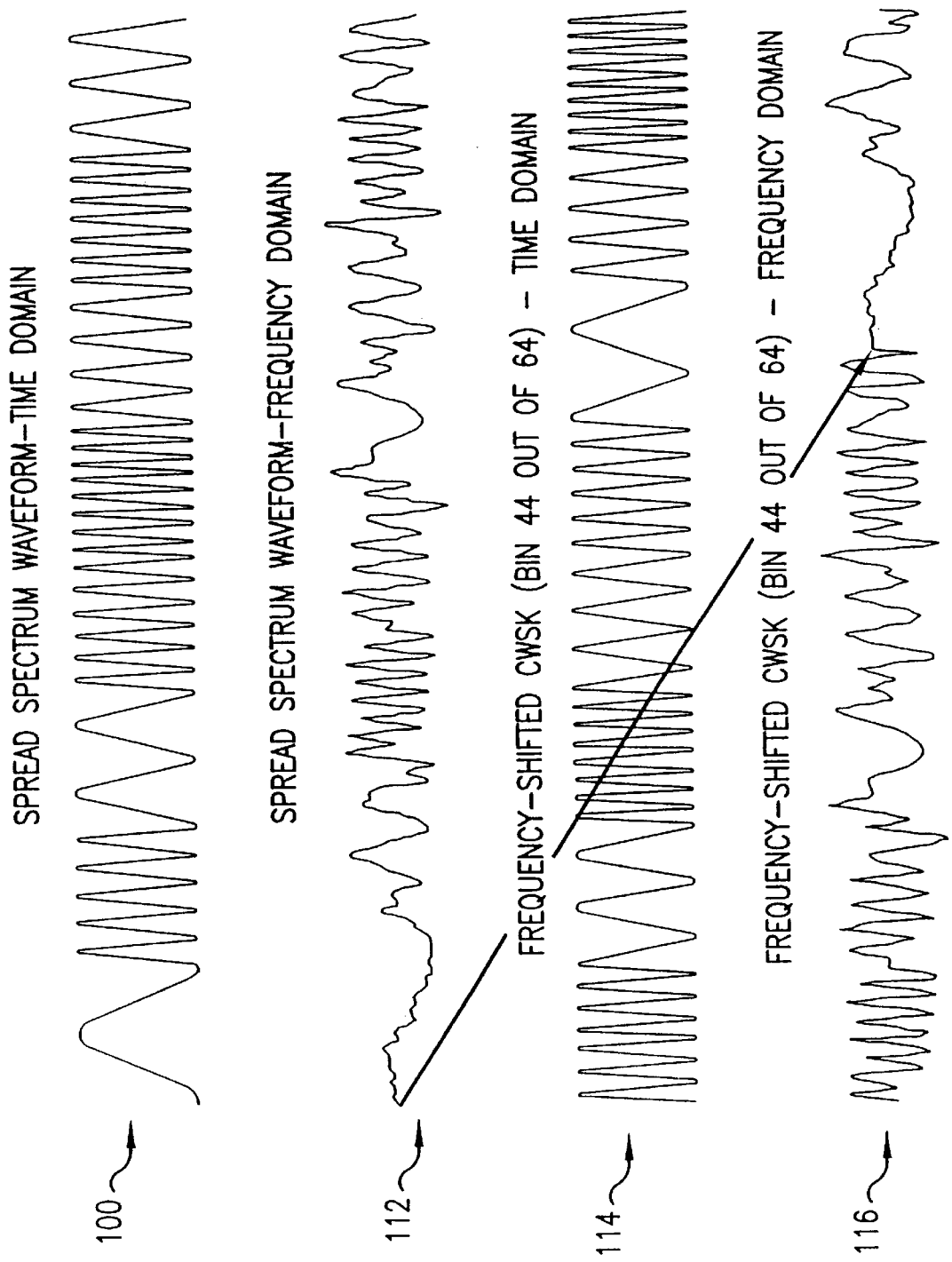
FIG. 1B is a diagram of a spread spectrum waveform with one-dimensional CWSK-F modulation according to the present invention.
Figure 1C:
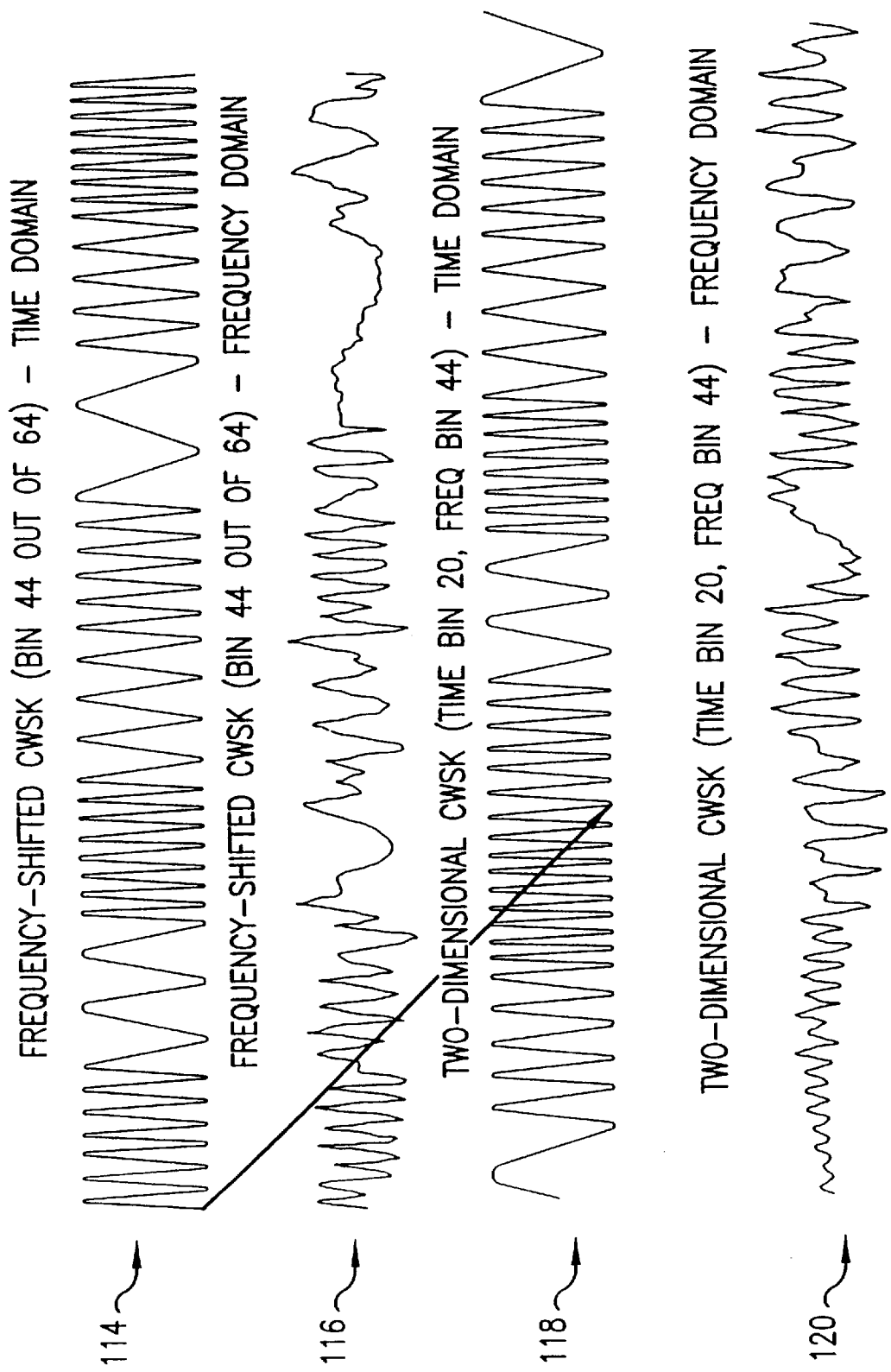
FIG. 1C is a diagram of a spread spectrum waveform with two-dimensional (CWSK-F/T) modulation according to the present invention.

FIG. 1A is a diagram of a spread spectrum waveform with one-dimensional CWSK-T modulation according to the present invention. FIG. 1B is a diagram of a spread spectrum waveform with one-dimensional CWSK-F modulation according to the present invention. FIG. 1C is a diagram of a spread spectrum waveform with two-dimensional CWSK modulation according to the present invention.

FIG. 1A is a visual depiction of CWSK-T modulation being applied to a direct-sequence spread spectrum waveform 100. Waveform 100 consists of eight frequency chips with eight different harmonic frequencies. A particular arrangement of the frequency chips is a specific spread spectrum code. In this example, the code sequence is {1,5,2,6,8,4,7,3}. This noise-like continuous waveform (NCW) 100 was chosen for this illustration for clarity and it should be noted that all CWSK modulations can be applied to any direct-sequence spread spectrum signal. Below the time domain NCW signal 100 is shown the real component of the frequency domain equivalent NCW signal 102. Time-domain CWSK-T waveform 104 represents the time domain NCW signal 100 directly modulated by time-shifted circular waveform shift-keying according to the present invention. Below the time domain CWSK-T waveform 104 is shown the real component of the frequency domain equivalent CWSK-T waveform 106. Time-shifted Circular Waveform Shift Keying (CWSK-T) is generated by circularly shifting the start of the spread spectrum waveform to a later time. This shifting is denoted by the bold arrow in FIG. 1A. Note in waveform 104 that the latter portion of the original spread spectrum waveform 100 has been inserted in the time period before the shifted start of the CWSK-T modulated signal. Performing this procedure circularly wraps the spread spectrum waveform within a fixed time window.

The frequency bandwidth of the eight-chip NCW waveform provides the time resolution to distinguish 64 equally spaced time increments per waveform. Shifting the start of the base NCW signal to one of the 64 time bins conveys six bits of information per waveform. In this example, the start of the waveform is at bin 20 in waveform 104 which could represent the CWSK-T transmission of the bit pattern 010100. By properly detecting the circular shift to this bin, this data can be received by a CWSK-T receiver.

FIG. 1B is a visual depiction of CWSK-F modulation being applied to a direct-sequence spread spectrum waveform 100. Waveform 100 consists of eight frequency chips with eight different harmonic frequencies. A particular arrangement of the frequency chips is a specific spread spectrum code. In this example, the code sequence is {1,5, 2,6,8,4,7,3}. This noise-like continuous waveform (NCW) 100 was chosen for this illustration for clarity and it should be noted that all CWSK modulations can be applied to any direct-sequence spread spectrum signal. Below the time domain NCW signal 100 is shown the real component of the frequency domain equivalent NCW signal 112.

Time-domain CWSK-F waveform 114 represents the time domain NCW signal 100 directly modulated by frequency-shifted circular waveform shift-keying according to the present invention. Below the time domain CWSK-F waveform 114 is shown the real component of the frequency domain equivalent CWSK-F waveform 116. Frequency-shifted Circular Waveform Shift Keying (CWSK-F) is generated by circularly shifting the start of the frequency-domain representation of the spread spectrum waveform to a later time. This shifting is denoted by the bold arrow in FIG. 1B. Note that the latter portion of the original spread spectrum frequency-domain waveform 112 has been inserted in the time period before the shifted start of the CWSK-F modulated signal 116. Performing this procedure circularly wraps the spread spectrum frequency-domain waveform within a fixed frequency window.

The time duration of the eight-chip NCW waveform provides the time resolution to distinguish 64 equally spaced frequency increments per waveform. Shifting the start of the base frequency-domain NCW signal to one of the 64 frequency bins conveys six bits of information per waveform. In this example, the start of the frequency domain waveform is at bin 44 in waveform 116 which could represent the CWSK-F transmission of the bit pattern 101100. By properly detecting the circular shift to this bin, this data can be received by a CWSK-F receiver.

FIG. 1C is a visual depiction of Two-Dimensional CWSK modulation being applied to a direct-sequence spread spectrum waveform 100. This example is for CWSK-F/T modulation which is one of the pair of 2D-CWSK modulations (with the other being CWSK-T/F). CWSK-F/T is generated by a combination of two circular shifts, one first in the frequency domain (CWSK-F) followed by another in the time domain (CWSK-T).

In this example, the base NCW waveform 100 has been first shifted to frequency bin 44 as in FIG. 1B above. The result of this circular wrapping operation in the frequency domain is evident in the real component of the frequency domain equivalent CWSK-F waveform 116. Circular time shifting is applied to the frequency-shifted signal 114 and is denoted by the bold arrow in FIG. 1C. The resulting time domain waveform 118 is the 2D CWSK-F/T signal actually transmitted. Below the time domain 2D CWSK-F/T waveform 118 is shown the real component of the frequency domain equivalent CWSK-F/T waveform 120.

The time duration of the eight-chip NCW waveforn provides the time resolution to distinguish 64 equally spaced frequency increments per waveform. Shifting the start of the base frequency-domain NCW signal to one of the 64 frequency bins conveys six bits of information per waveform. The frequency bandwidth of the eight-chip NCW waveform provides the time resolution to distinguish 64 equally spaced time increments per waveform. Shifting the start of the base NCW signal to one of the 64 time bins conveys six bits of information per waveform. By combining frequency and time shifting, as in CWSK-F/T modulation, a total of twelve bits can be conveyed in a single waveform 118.

In this example, the start of the frequency domain waveform 114 is at bin 44 which could represent the bit pattern 101100. The start of the frequency-shifted waveform is then shifted to time bin 20 in waveform 118 which could represent the transmission of the bit pattern 010100. By properly detecting the two circular shifts to this one frequency-time bin, the combined data 101100010100 can be received by a CWSK-F/T receiver.

Figure 2:
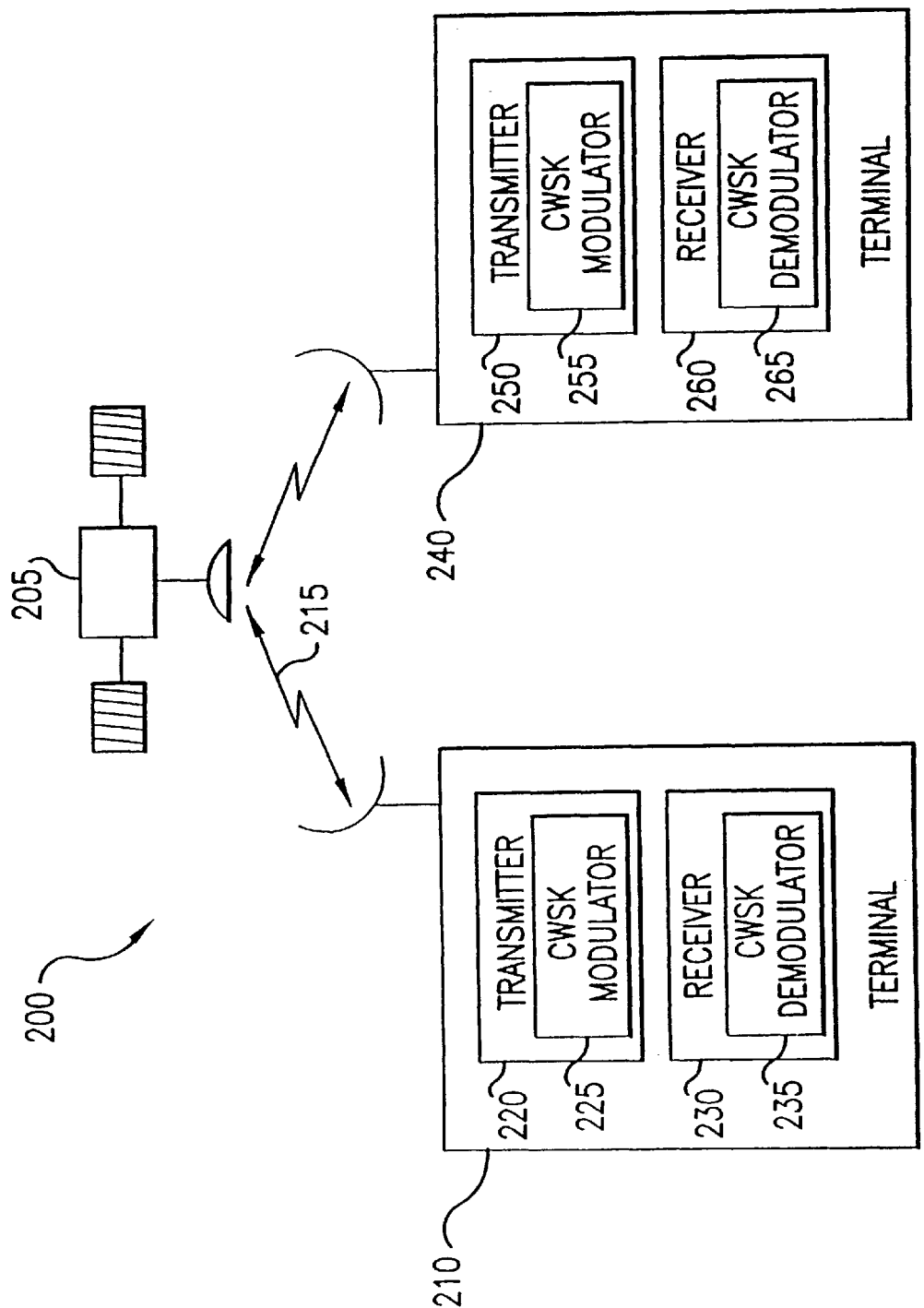
FIG. 2 is a diagram showing a hubless satellite network according to one embodiment of the present invention.

FIG. 2 is a diagram of a satellite network 200 supporting circular waveform shift-keying according to the present invention. In one example, satellite network 200 is a hubless network wherein many transceiver terminals can communicate directly to other transceiver terminals in network 200. For example, satellite network 200 can be, but is not limited to, a hubless VSAT type of network (Ku or C band).

For clarity, FIG. 2 only shows two terminals 210, 240 coupled for data communication by a satellite link 215 through satellite 205. Terminal 210 is a transceiver that includes a transmitter 220 and receiver 230. Transmitter 220 includes a CWSK modulator 225. Receiver 230 includes a CWSK demodulator 235. Terminal 240 is a transceiver terminal that includes a transmitter 250 and receiver 260. Transmitter 250 includes a CWSK modulator 255. Receiver 260 includes a CWSK demodulator 265. As would be obvious to one skilled in the art given this description, the present invention is not limited to transceiver terminals. Terminals 210, 240 can have separate transmitters and receivers at different sites or locations.

Spread spectrum communication between terminal 210 and terminal 240 conveys data over spread spectrum channels in satellite link 215 using time-shifted and/or frequency-shifted circular waveform shift keying (CWSK-T, CWSK-F, CWSK-T/F, or CWSK-F/T). Transmitter 220 conveys data by encoding data with circular waveform shift keying on a carrier signal using CWSK modulator 225. For example, CWSK modulator 225 can generate a CWSK modulated waveform using various methods. Digital samples of the CWSK modulated signal can be created by a direct digital synthesizer (DDS) or computed by a processor. These samples are input to a digital-to-analog converter generating the analog waveform for transmission. For CWSK-T, the spread spectrum waveform can be stored in a circular buffer and depending upon the data to be sent, a different starting point can be chosen. Samples are then read out of the buffer and output to a digital-to-analog converter.

The carrier waveform does not have to be phase-modulated, for example, a frequency coded noise-like waveform (NCW) can be used. In one embodiment, the frequency coded NCW signal allows the same modulator to be utilized for all types of CWSK modulation. For example, the frequency control input to a DDS can be used to generate a specified series of frequency hops. The time duration of each hop can be easily adjusted allowing the first and last frequency chips to be of different duration than the middle chips. This allows a chip to be split between the beginning and end of a NCW signal which occurs with CWSK-T modulation. CWSK-F modulation is accomplished by changing the actual frequencies of each chip in a circular fashion. By adding a fixed frequency increment to each chip modulo of the frequency bandwidth, a new set of CWSK-F encoded frequency chips are created. Two-dimensional CWSK modulation is generated using the NCW signal by combining the two CWSK-T and CWSK-F modulation techniques.

Terminal 240 receives signals transmitted by transmitter 220. Receiver 260 uses CWSK demodulator 265 to demodulate circular waveform shift keying signals. Spread spectrum communication using either type of circular waveform shift keying (CWSK-T, CWSK-F, CWSK-T/F, or CWSK-F/T) is conducted in two stages, a synchronization stage and a demodulation/tracking stage.

Synchronization Stage

Figure 3A:
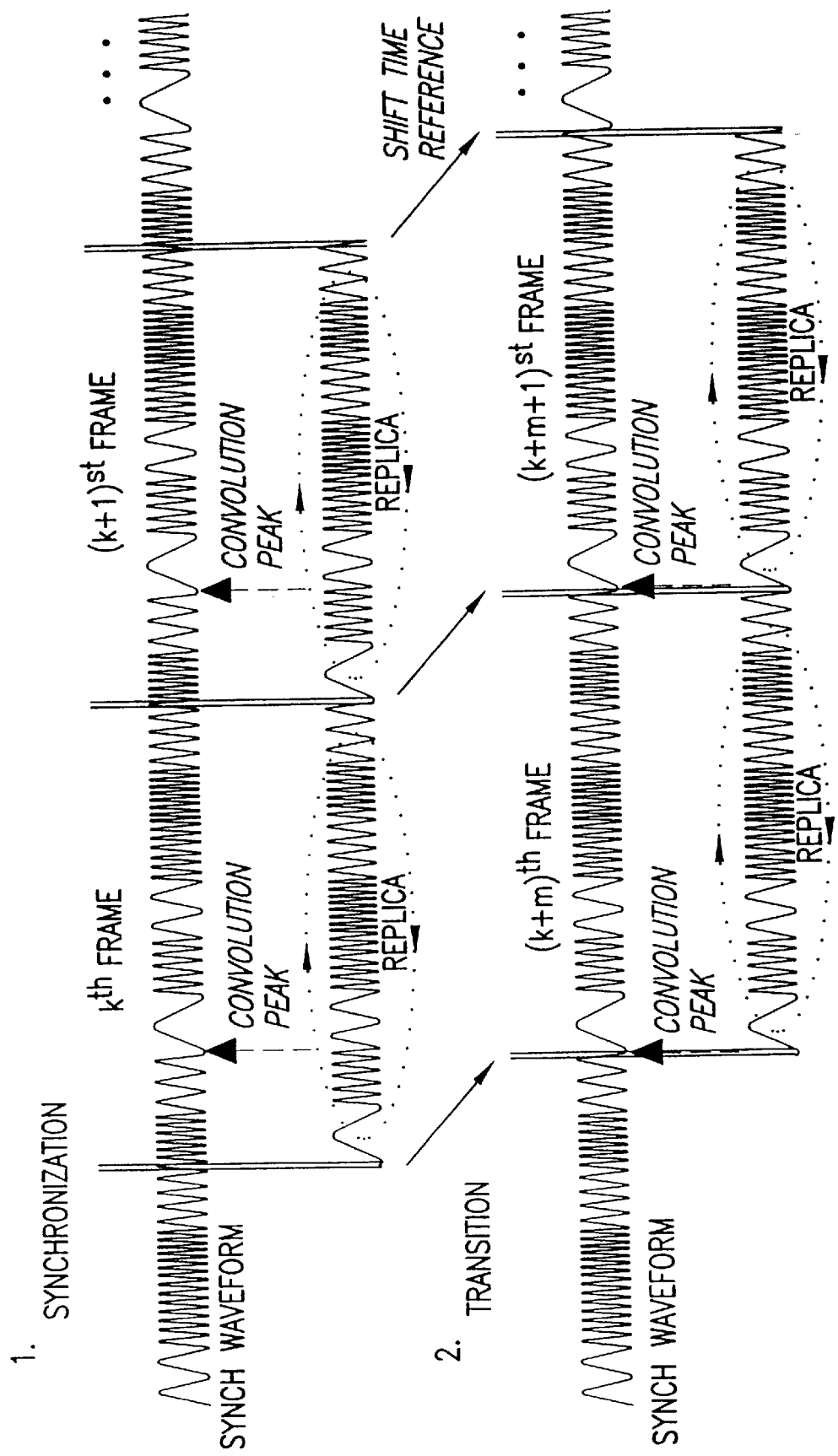
FIGS. 3A and 3B show CWSK signal processing according to the present invention.

To establish meaningful communication, terminal 210 and terminal 240 must first be synchronized. This synchronization is also called an acquisition stage. In a synchronization stage, CWSK modulator 225 transmits synch symbols. In general, a synch symbol can be encoded by any predetermined circular timeshift of a spread spectrum waveform within a frame. For example, as shown in FIG. 3A, a synch symbol can be a CWSK waveform having a zero time shift and a zero frequency shift.

Receiver 260 then synchronizes the receiver terminal to the CWSK synch waveform that is received. CWSK demodulator 265 performs a fast convolution operation between a frame in the transmitted spread spectrum CWSK synch waveform and a stored replica to detect a convolution peak. The detected convolution peak is then used to detect a time shift, if any, between frames in the asynchronous transmitter and receiver terminals 210, 240. In this way, a time reference in the receiver can be shifted in a transition stage to synchronize the receiver to the frames being received.

Figure 4:
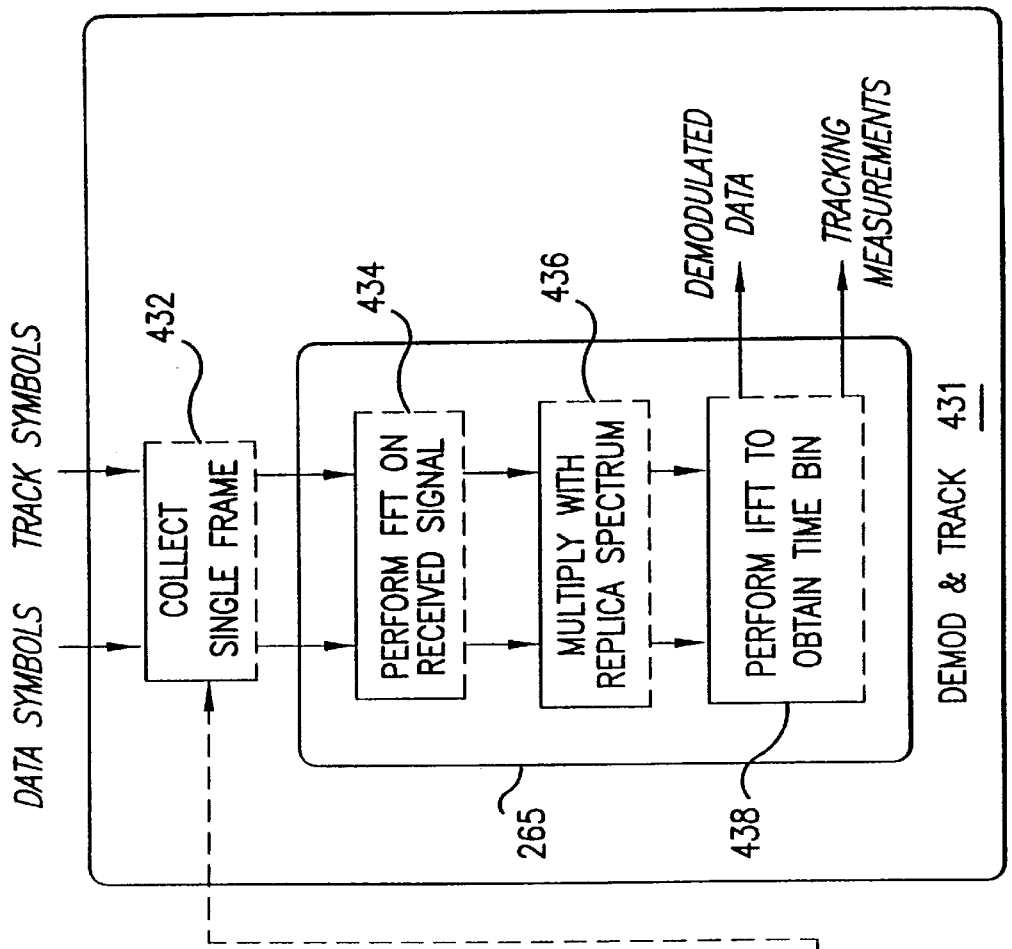
FIG. 4 is a diagram of a CWSK-T communication routine according to the present invention.
Figure 4:
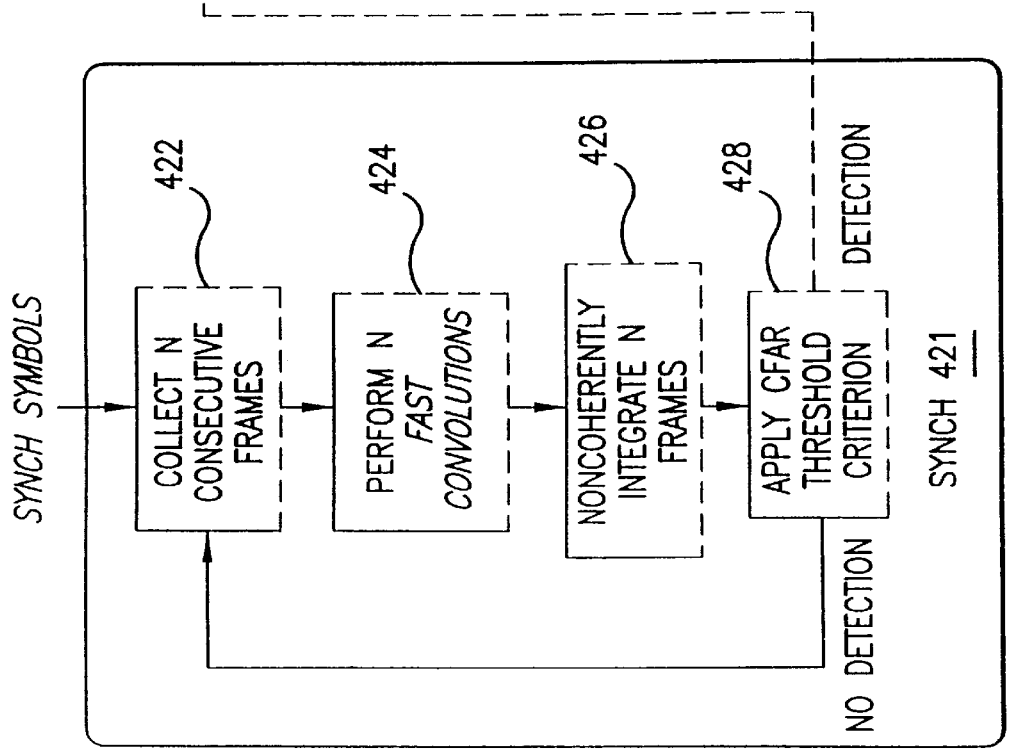

Repeating the CWSK synch waveform from frame to frame allows fast convolution processing to acquire and synchronize no matter what the timing mismatch is between the transmitter and receiver. As shown in FIG. 3A, the receiver frame can straddle two different transmitter frames, but a circular convolution matches both waveform sections together within each repeated frame FIG. 4 is a diagram showing CWSK processing in a receiver 260 according to one embodiment of the present invention. CWSK processing at a receiver includes a synch stage 421 and a demodulation stage 431. In synch stage 421, receiver 260 operates in a synchronization mode that collects N consecutive frames of the transmitted spread spectrum CWSK waveform, where N is an integer (step 422). CWSK demodulator 265 operates in a synchronization mode that performs N fast convolutions between the N frames and a stored replica of a frame of the transmitted spread spectrum CWSK waveform to detect N convolution peaks (step 424). CWSK demodulator 265 noncoherently integrates N detected convolution peaks and outputs an output signal representative thereof (step 426). In step 428, CWSK demodulator 265 (or alternatively receiver 260) applies a CFAR threshold criterion to detect when the output signal exceeds a predetermined threshold indicating a synch has been detected. The receiver 260 then shifts a time reference signal based on the detected synch symbol to synch the receiver terminal 240 to transmitted frames.

Demodulation and Tracking Stage

To transfer data, CWSK modulator 225 directly modulates a direct sequence carrier waveform to produce a CWSK data waveform having data symbols encoded by circular waveform shift-keying (CWSK-T, CWSK-F, CWSK-T/F, or CWSK-F/T). Each data symbol is encoded by a circular time-shift and/or frequency-shift of a spread spectrum waveform within a frame. The data symbol can represent any type of digital data, including but not limited to, data related to voice, telephony, audio, video, graphics, and computer network traffic.

CWSK demodulator 265 demodulates a received CWSK data waveform to extract data symbols encoded by circular waveform shift-keying (CWSK-T, CWSK-F, CWSK-T/F, or CWSK-F/T).

Tracking can also be provided for the data transfer. CWSK data symbols can be compared against different tracking replicas. Alternatively, special track symbols can be encoded by CWSK modulation and used for tracking.

Figure 3B:
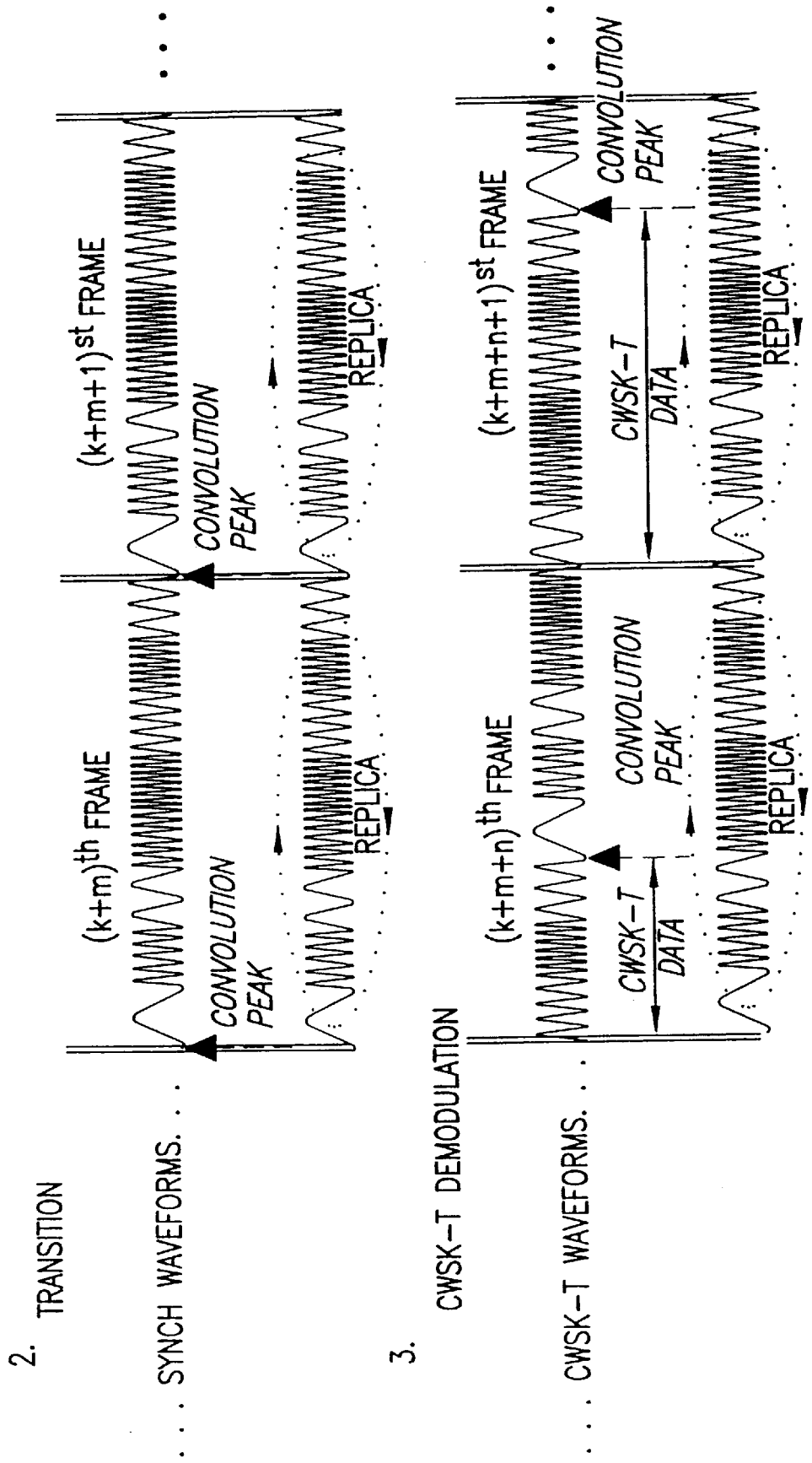

According to one embodiment to transfer data, as shown in FIGS. 3B and 4, CWSK demodulator 265 in the receiver 260 can be operated in demodulation mode and tracking mode in parallel. CWSK demodulator 265 operates in a track mode in parallel with the data demodulation. Tracking measurements can be made based on demodulated data symbols with different tracking replicas to maintain a time window and to compensate for any frequency shift in frames being transmitted and received. Alternatively, a transmitter can transmit a spread spectrum waveform having a track symbol encoded by CWSK modulation. CWSK encoded track symbols are then demodulated like CWSK encoded data symbols in a separate tracking mode of operation.

Four embodiments of CWSK demodulator processing for demodulating CWSK-T, CWSK-F, CWSK-T/F, and CWSK-F/T data waveforms are described in even further detail below with reference to FIGS. 3B to 10. For clarity, CWSK demodulator 265 is referred to as CWSK-T demodulator 265 when describing time-shifted circular waveform shift keying demodulation only. Likewise, CWSK demodulator 265 is referred to as CWSK-F demodulator 265, when describing frequency-shifted circular waveform shift keying demodulation only, and is referred to as CWSK-T/F demodulator 265 and a CWSK-F/T demodulator 265 when describing time-shifted and frequency-shifted circular waveform shift keying demodulation.

Time-Shifted Circular Waveform Shift-Keying

The synchronization waveform processing shown in FIG. 3A and described with respect to synch stage 421 is performed for all four means of CWSK modulation (CWSK-T, CWSK-F, CWSK-T/F, CWSK-F/T). After the transition to the proper framing, any of the demodulations can be applied.

Circular convolution is the natural result of the digital signal processing technique known as fast convolution which utilizes the Fast Fourier Transform (FFT). In many applications, this is undesirable since a linear convolution is the desired output. Special methods (e.g. overlap-and-add) are used to convert the circular convolution to a linear convolution. Even with the additional burden of these special methods, fast convolution still requires less computations.

Fast convolution is the FFT implementation of the Convolution Theorem which states that a shift in time (or frequency) manifests itself in the transform frequency (or time) domain as a multiplication with a complex sinusoid. By multiplying the transform domain signal obtained by a FFT by a replica in the same transform domain, the complex sinusoid is obtained. A second Fourier transform (FFT) can be then utilized to analyze the complex sinusoid. The process of applying a FFT to a signal, multiplying by a replica and applying an inverse FFT to the multiplicative result is defined to be fast convolution.

Circular Waveform Shift-Keying in the time-domain (CWSK-T) is designed to take advantage of fast convolution and FFTs. The circular waveform shift modulated is exactly demodulated by the circular convolution of the received signal and the unmodulated, unshifted replica waveform. Fast convolution demodulation of CWSK-T is the steps of applying a FFT to the received signal, multiplying by a frequency-domain replica, applying an inverse FFT and choosing the resulting sample with highest absolute power.

FIG. 3B shows a CWSK-T data waveform processed in CWSK-T demodulation. FIG. 4 is a diagram of a routine for CWSK-T demodulation according to one embodiment of the present invention. CWSK-T demodulation is described further below with respect to demodulation stage 431 (steps 432–438). To demodulate data, receiver 260 collects a frame of a spread spectrum CWSK-T data waveform (step 432). CWSK-T demodulator 265 performs a Fast Fourier Transform on the collected frame to obtain a frequency-domain signal representative of the received spread spectrum CWSK-T data waveform frame (step 434). CWSK-T demodulator 265 multiplies the frequency-domain signal with a replica spectrum and provides a product output signal representative thereof (step 436). The replica spectrum represents a Fast Fourier Transform of a time-domain replica of a frame of the transmitted spread spectrum CWSK-T waveform. CWSK-T demodulator 265 then performs an inverse Fast Fourier Transform on a product output signal to obtain the time domain convolution result (step 438). This time-domain signal contains a time bin indicative of the data symbol in the collected frame. In one embodiment, the CWSK-T demodulator would output the data associated with the time bin of largest magnitude in power.

Fast Convolution Receiver Processing

According to a further feature of the present invention, time-shifted circular-waveform shift-keying modulation (CWSK-T) allows a spread spectrum receiver to be realized such that a synchronizing stage and a demodulator stage are implemented on a single integrated chip. In one embodiment, only one fast convolution ASIC is needed at a receiver terminal.

Figure 5:
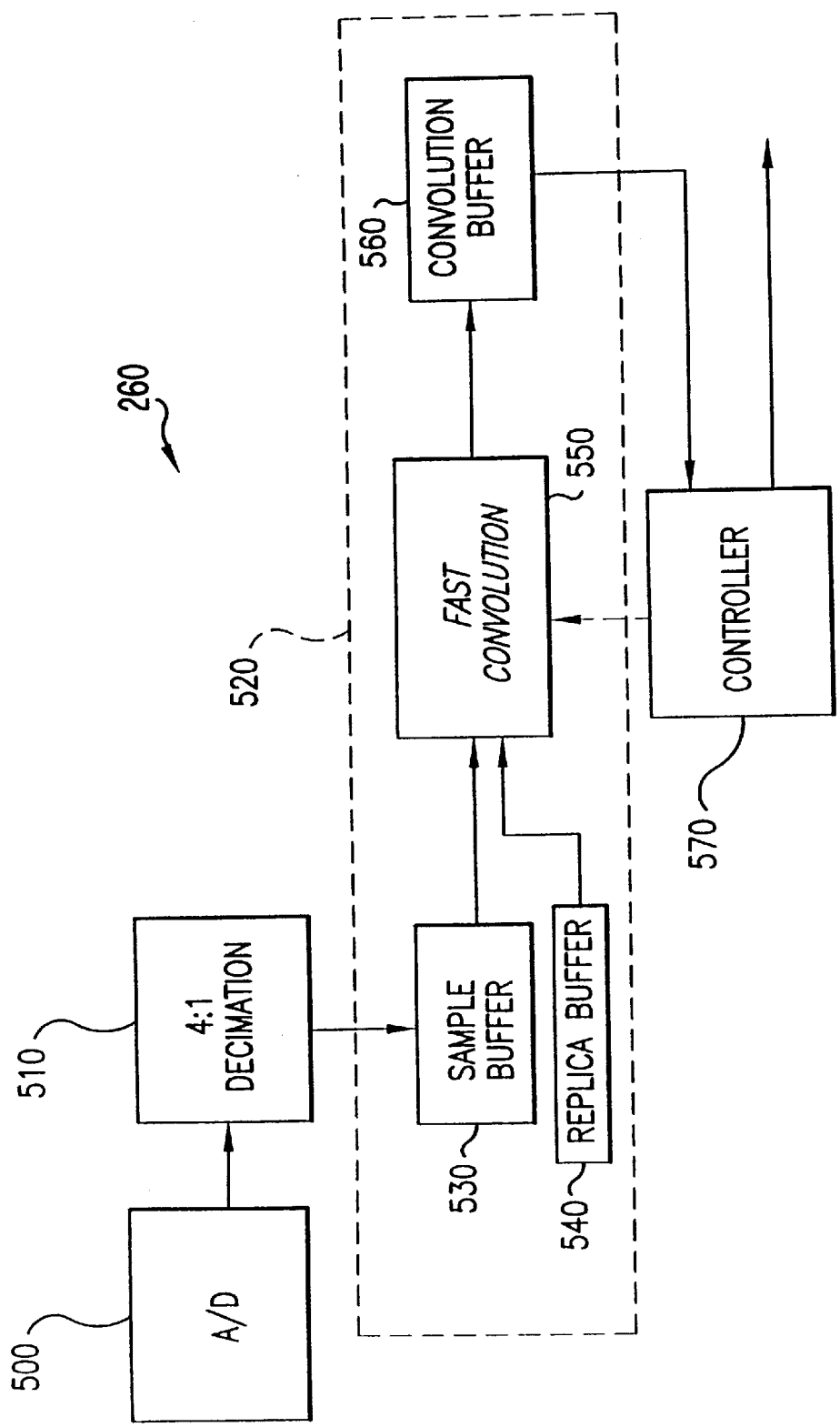
FIG. 5 is a block diagram of a receiver having CWSK-T demodulation according to one embodiment of the present invention.

FIG. 5 is a block diagram of a receiver 260 according to the present invention. Receiver 260 includes an analog/digital convertor 500 and decimator 510 for converting and decimating a received waveform. Any conventional A/D converter and decimator can be used.

According to the present invention, receiver 260 further includes a fast convolution module 520 and a controller 570. Fast convolution module 520 includes a complex sample buffer 530, a complex replica buffer 540, a fast convolution processor 550, and a real convolution buffer 560. Fast convolution processor 550 is a dual Fast Fourier Transform (FFT) processor. Fast convolution processor 550 performs the following operations: an N-point complex forward FFT, N-point complex multiply, N-point complex inverse FFT, and N-point complex magnitude squared. Controller 570 is coupled to the fast convolution module 520 for switching fast convolution processor 550 between a synchronization mode and a demodulation mode for each spread spectrum channel.

Receiver 260 can be implemented in software, firmware, hardware, or any combination thereof. Any of the components of receiver 260, that is, A/D converter 500, decimator 510, fast convolution module 520, and controller 570, can be implemented in software, firmware, hardware, or any combination thereof.

Fast Convolution ASIC

Figure 6:
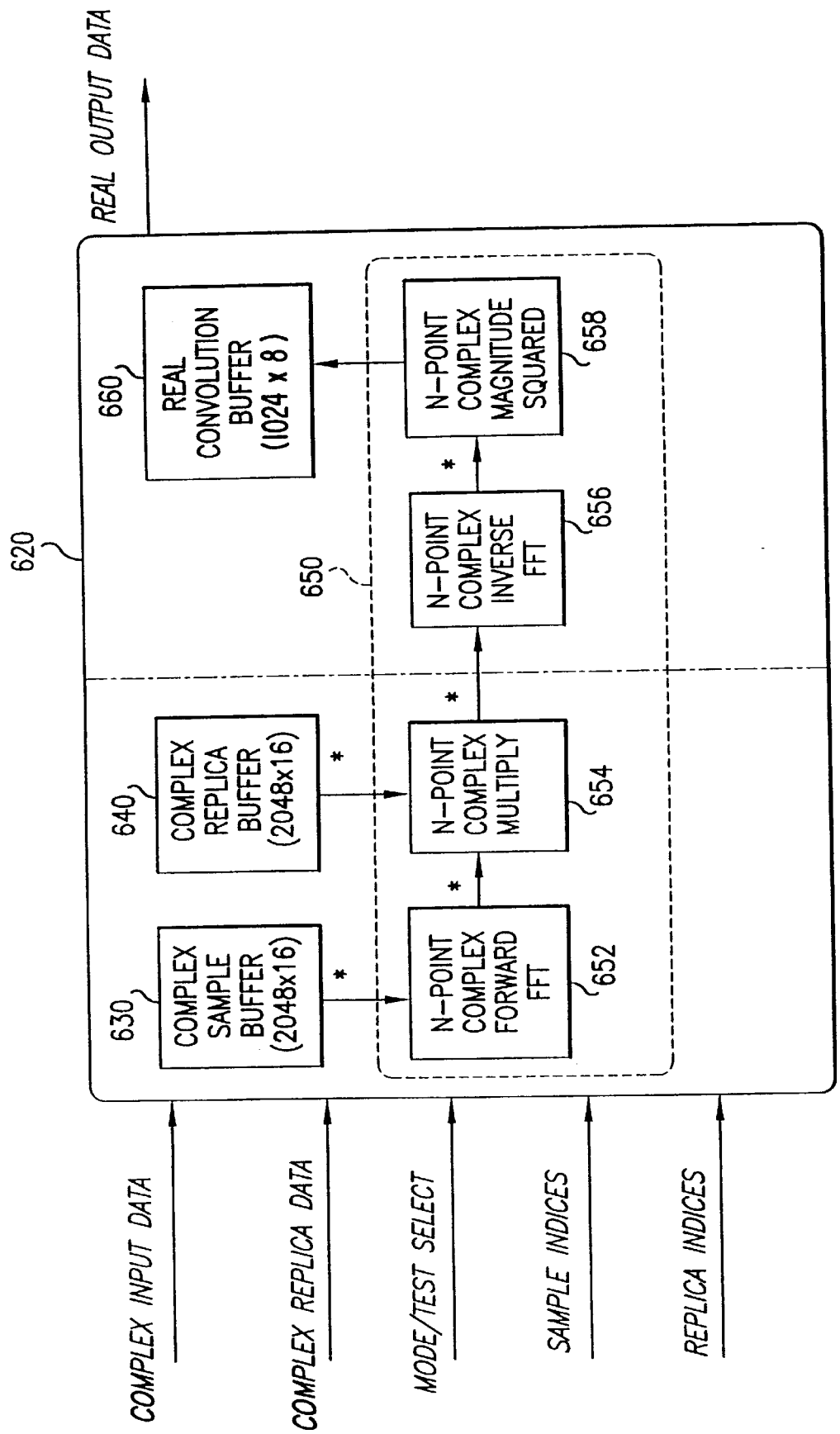
FIG. 6 is a block diagram of a fast convolution ASIC used in CWSK demodulation according to one embodiment of the present invention.

In one example, fast convolution module 520 is fabricated as a single fast convolution ASIC chip 620 (FIG. 6). Fast convolution ASIC chip 620 is a dual Fast Fourier Transform (FFT) processor. Fast convolution ASIC chip 620 includes a complex sample buffer 630, a complex replica buffer 640, a fast convolution processor 650, and a real convolution buffer 660. Fast convolution processor 650 includes an N-point complex forward FFT module 652, an N-point complex multiply module 654, an N-point complex inverse FFT module 656, and an N-point complex magnitude squared module 658.

The complex sample buffer 630 is loaded with complex input data from the receiver which has been sampled with both real and imaginary components. This data contains the CWSK symbol to be acquired or demodulated. As described above, the CWSK synchronization and demodulation stages require a known replica signal which is loaded as complex replica data into the complex replica buffer 640.

The controller 570 for the fast convolution ASIC 620 selects a processing mode from the set of modes, CWSK synchronization, CWSK-F demodulation, or self-test. CWSK-T demodulation uses the same mode as CWSK synchronization. Controller 570 also controls the starting and stopping positions (sample and replica indices) for processing data from the same buffer 630 and the replica buffer 640. This allows control of the framing and the number of samples to use in the fast convolution processing.

A low-cost receiver is realized that uses a single fast convolution ASIC 620 to process four spread spectrum channels. CWSK demodulation is performed for eight-bit CWSK encoded data symbols at a 4.8 kilobit/sec (kbps) data rate. Fast convolution ASIC 620 can be operated in two modes, acquisition and demodulation. The acquisition mode at 1024-points is used for CWSK synchronization. The demodulation mode at 256-points is used for CWSK demodulation.

Frequency-Shifted Circular Waveform Shift-Keying

According to a feature of the present invention, frequency-shifted CWSK modulation (CWSK-F) is provided where data symbols are encoded in a circular frequency shift of the spread spectrum waveform. In one embodiment, a CWSK-F modulator and demodulator are provided. In a demodulation mode, the transmitter transmits a frequency-shifted CWSK data waveform. Data symbols are encoded by a circular frequency-shift of a spread spectrum waveform within each frame. The data symbol can represent any type of digital data, including but not limited to, data related to voice, telephony, audio, video, graphics, and computer network traffic.

The receiver receives and demodulates the spread spectrum CWSK-F data waveform sent by a transmitter to extract the modulated data. The receiver includes a CWSK-F demodulator that performs at least one convolution operation between a frame in the transmitted spread spectrum CWSK-F data waveform and a stored replica to detect a location of a convolution peak within a frame. The detected convolution peak location within a frame represents the data symbol.

Figure 7:
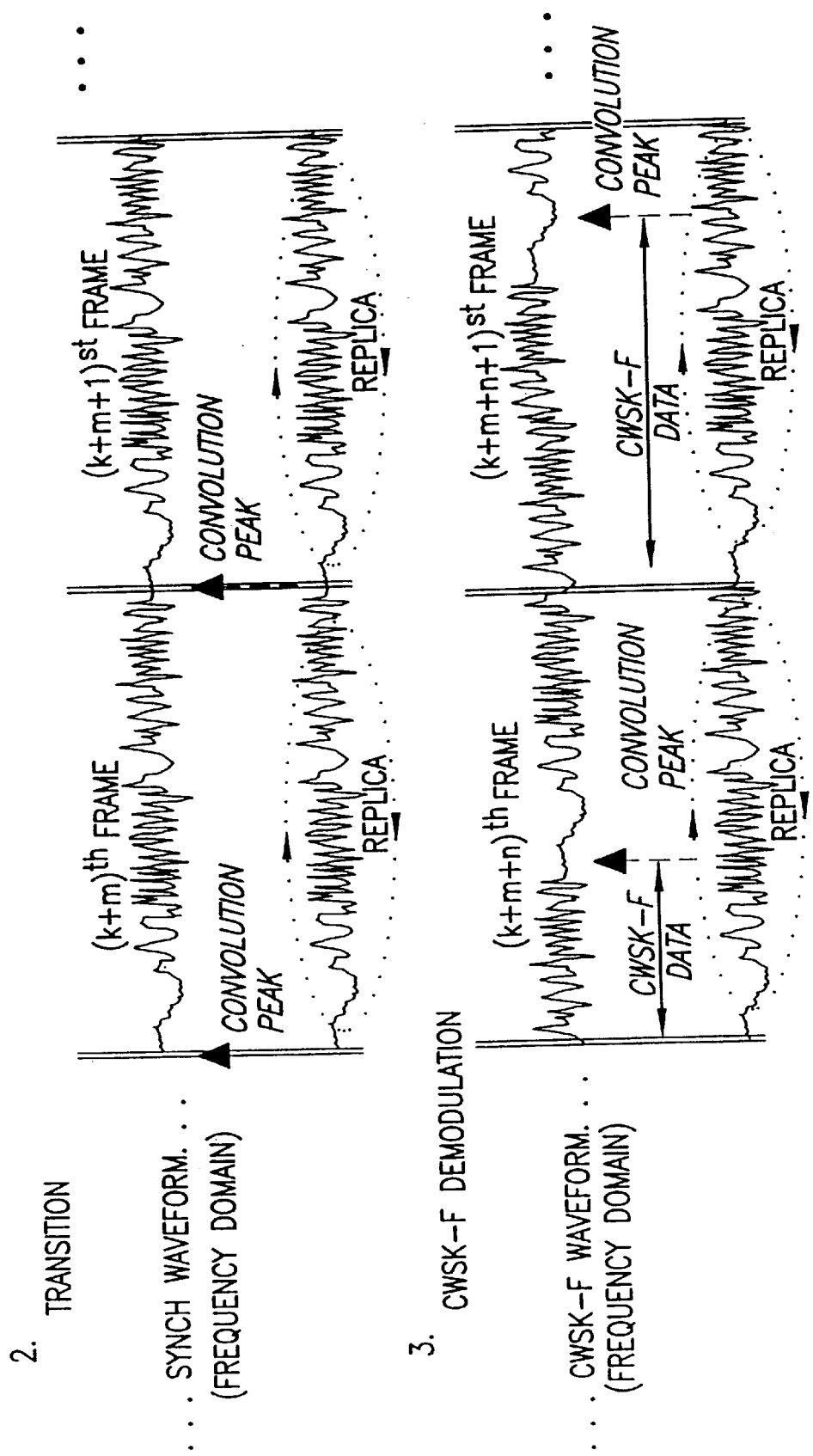
FIG. 7 shows demodulation processing of a CWSK-F data waveform.

FIG. 7 shows the frequency domain waveforms for the transition stage and demodulation stage. This Figure shows the analogous waveform processing for CWSK-F to the processing shown in FIG. 3B. In this Figure, all signals are represented in the frequency domain.

The replica for the CWSK-F demodulation is the complex data generated when a Fourier transform is applied to the unmodulated time-domain spread spectrum signal. The received signal is the complex data generated when a Fourier transform is applied to the received CWSK-F modulated time-domain spread spectrum signal. A circular convolution between the replica and the received signal performs the demodulation. By selecting the frequency bin with the highest received power, the intentional circular shift can be detected. The magnitude of the shift indicates the data that was transmitted.

A substantial simplification occurs in the demodulation of CWSK-F signals. Note that the straightforward application of the convolution operation begins in the frequency domain. The first step is to transform both the replica and received CWSK-F waveforms into the time domain. However, note that sampling the received signal in the time domain is the transformed CWSK-F waveform. Therefore using the unmodulated time-domain spread spectrum waveform and multiplying with the received CWSK-F time samples will result in the complex sinusoid associated with intentional modulation directly without having to perform the first FFT of the fast convolution algorithm. Applying only the second FFT after the multiplication will produce the desired CWSK-F demodulation output and saves one FFT operational stage.

Figure 8:
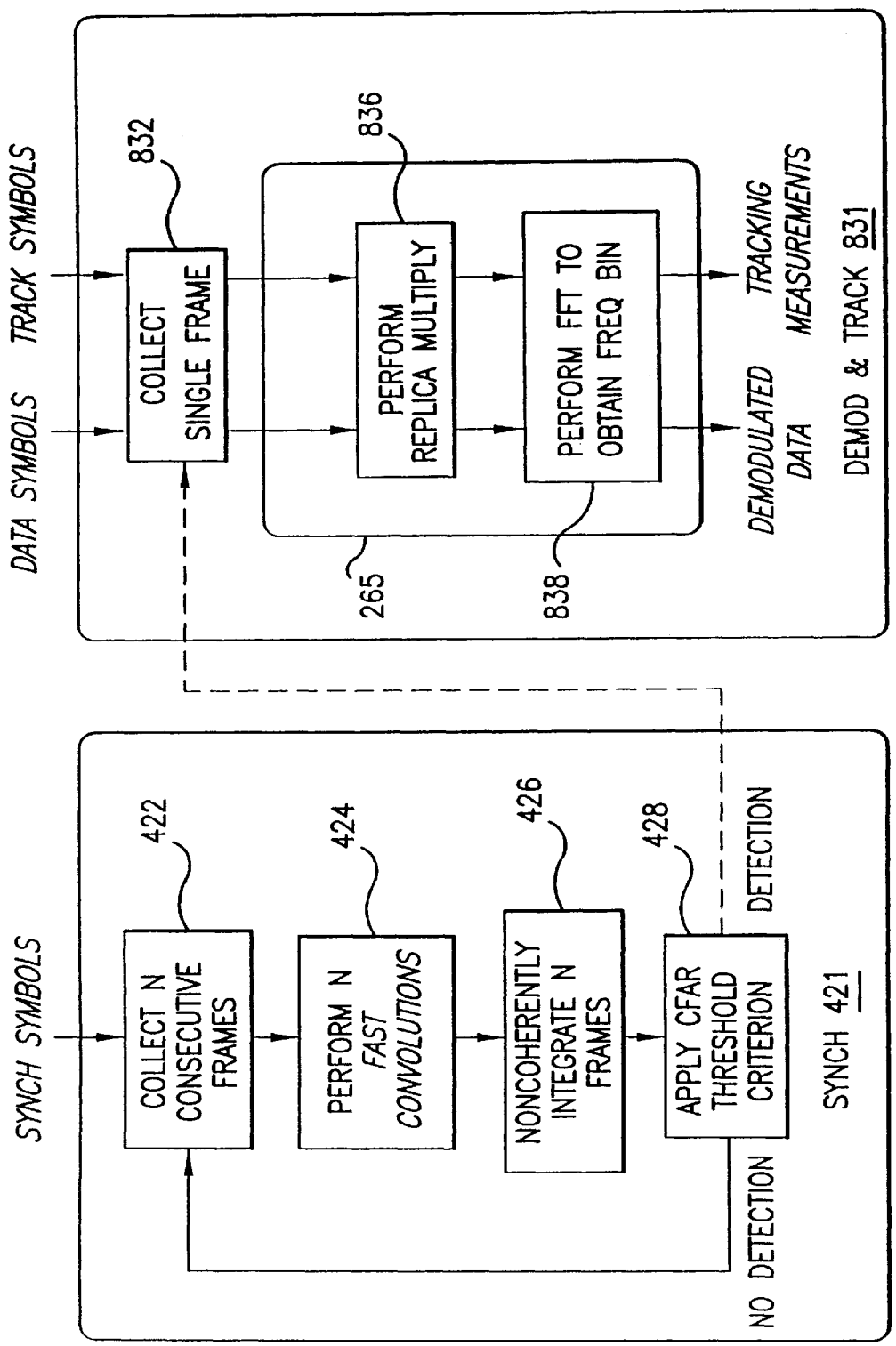
FIG. 8 is a diagram of a CWSK-F communication routine according to the present invention.

FIG. 8 is a diagram of a routine for CWSK-F demodulation for a demodulation stage 831 according to one embodiment of the present invention. In demodulation mode, receiver 260 collects a frame of the frequency-shifted CWSK-F data waveform (step 832). CWSK-F demodulator 265 multiplies this time-domain signal with a replica and provides a product output signal representative thereof (step 836). The replica represents a time-domain replica of a frame of the transmitted spread spectrum CWSK-F waveform. CWSK-F demodulator 265 then performs a Fast Fourier Transform on a product output signal to obtain the frequency-domain convolution result (step 838). This frequency-domain signal contains a frequency bin indicative of the data symbol in the collected frame. In one embodiment, the CWSK-F demodulator would output the data associated with the frequency bin of largest magnitude in power. Thus, receiver processing for CWSK-F is simpler than that for CWSK-T, as only one Fast Fourier Transform type operation is performed.

According to a feature of this CWSK-F embodiment, the receiver can be operated in CWSK-F demodulation mode and tracking mode in parallel. The receiver can be switched to a track mode. Tracking measurements can be made based on demodulated data symbols with different tracking replicas to maintain a time window and to compensate for any frequency shift in frames being transmitted and received. Alternatively, a transmitter can transmit a spread spectrum CWSK-F waveform having a known track symbol encoded by frequency-shifted circular-waveform shift-keying. CWSK-F encoded track symbols are then demodulated like CWSK-F encoded data symbols.

According to a further feature of the present invention, frequency-shifted circular-waveform shift-keying allows a spread spectrum receiver to be realized such that a synchronizing stage and a demodulator stage are implemented in software, firmware, hardware, and any combination thereof. In one example, a CWSK-F demodulator can be implemented primarily in software only with little or no change to existing hardware. In another example, a CWSK-F demodulator can be implemented primarily in one fast convolution ASIC at a receiver terminal for CWSK-T demodulation and tracking.

The CWSK-F receiver includes a fast convolution module and a controller for switching the fast convolution module between a synchronization mode and a demodulation mode for each spread spectrum channel. The fast convolution module is fabricated as a single fast convolution ASIC chip. In one example, the fast convolution ASIC chip includes a complex sample buffer, a complex replica buffer, a fast convolution processor, and a real convolution buffer. The fast convolution processor is a Fast Fourier Transform (FFT) processor. The fast convolution processor performs the following operations for CWSK-F demodulation: an N-point complex multiply, N-point complex FFT, and N-point complex magnitude squared.

In one example, a low-cost receiver is realized that uses a single fast convolution ASIC to process four spread spectrum channels. CWSK-F demodulation is performed for eight-bit CWSK encoded data symbols at a 4.8 kilobit/sec (kbps) data rate. The fast convolution ASIC can be operated in two modes, acquisition and demodulation. The acquisition mode at 1024-points is used for CWSK-F synchronization. The demodulation mode at 256-points is used for CWSK-F demodulation.

Time-Shifted and Frequency-Shifted Circular Waveform Shift-Keying

According to a feature of the present invention, time-shifted and frequency-shifted 2D CWSK modulation (CWSK-T/F and CWSK-F/T) is provide where data symbols are encoded in two-dimensions, that is, by a circular time shift and a circular frequency shift of the spread spectrum waveform. A 2D CWSK modulator and a 2D CWSK demodulator are provided. In a demodulation mode, the transmitter transmits a time-shifted and frequency-shifted 2D CWSK data waveform.

Data symbols are encoded by a circular time shift and a circular frequency shift of a spread spectrum waveform within each frame. For example, eight-bit CWSK modulation in each of time and frequency domains provides a total of sixteen bits per symbol, and total of 65,536 unique time/frequency data points or blocks (256 time bins by 256 frequency bins). The data symbol can represent any type of digital data, including but not limited to, data related to voice, telephony, audio, video, graphics, and computer network traffic.

In another feature of the present invention, CWSK-F and CWSK-T are multiplexed on the same spread spectrum channel. For example, CWSK-T modulation can be used for voice data and CWSK-F modulation can be used for data.

In another feature of the present invention, two-dimensional CWSK can be used for a high-capacity synchronous spread spectrum channel. All users share the same spread spectrum code but use different blocks of time-frequency bins to transmit and receive data. This embodiment has the advantage that the auto-correlation of a spread spectrum waveform can be lower than the cross correlation between different ones.

Figure 9A:
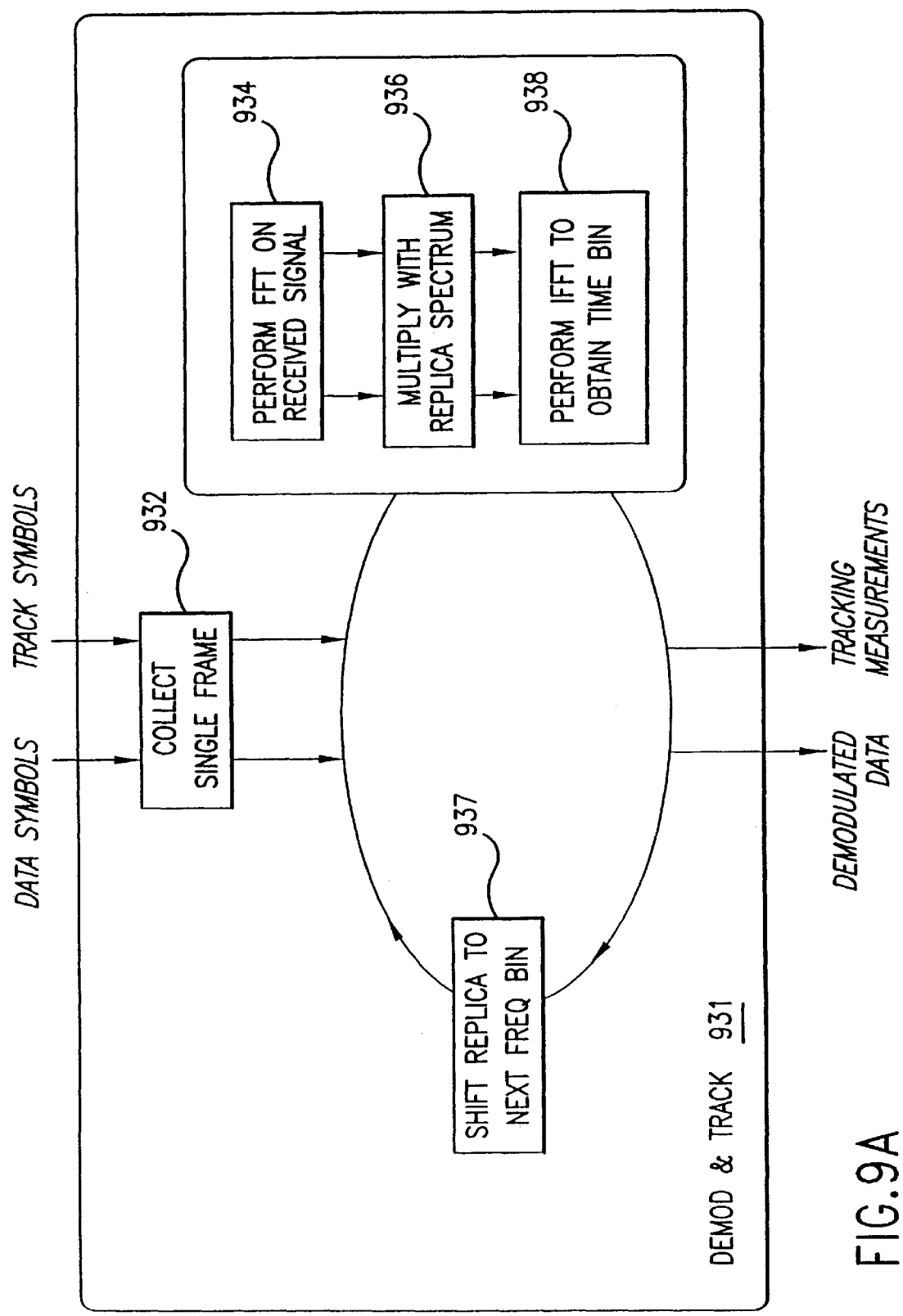
FIG. 9A is a block diagram of a receiver having CWSK-T/F demodulation according to one embodiment of the present invention.

FIG. 9A shows a routine in a two-dimensional CWSK demodulation stage 931 according to a CWSK-T/F demodulation embodiment. In this embodiment, CWSK-T demodulation is repeated for multiple frequency bins. In demodulation mode, receiver 260 collects a frame of the CWSK-T/F data waveform (step 932). CWSK-T/F demodulator 265 performs a Fast Fourier Transform on the collected frame to obtain a frequency-domain signal representative of the received CWSK-T/F data waveform frame (step 934). CWSK-T/F demodulator 265 multiplies the frequency-domain signal by a set of circularly frequency-shifted replica spectrums associated with a range of frequencies (steps 936 and 937). This replica spectra multiplication produces a corresponding set of frequency bins. CWSK-T/F demodulator 265 then performs an inverse Fast Fourier Transform on the set of frequency bins to product a set of time bins (step 938). Receiver 260 then chooses the largest time and frequency bin to determine a CWSK-T/F encoded data symbol.

Figure 9B:
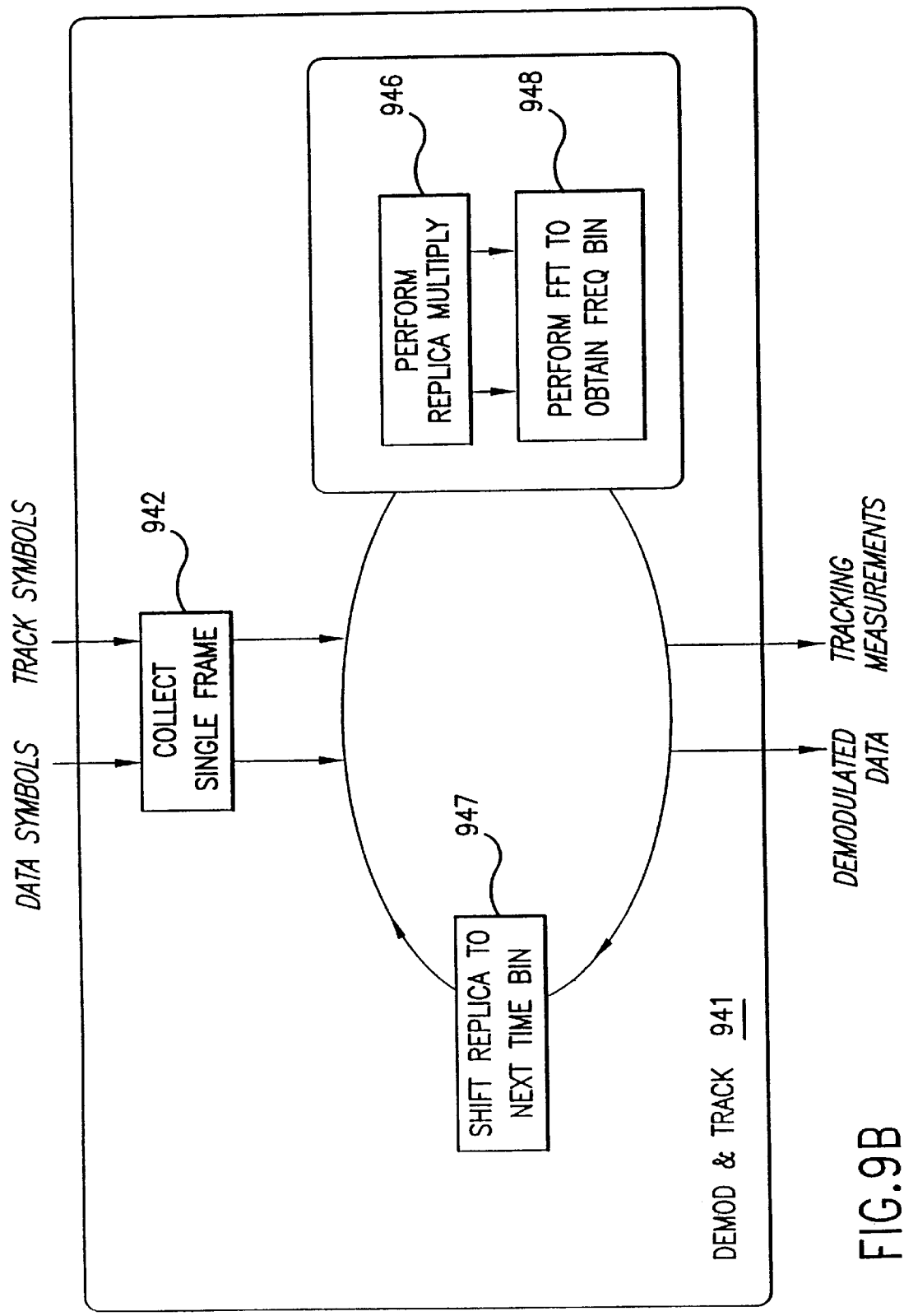
FIG. 9B is a block diagram of a receiver having CWSK-F/T demodulation according to one embodiment of the present invention.

FIG. 9B shows a routine in a two-dimensional CWSK demodulation stage 941 according to a CWSK-F/T demodulation embodiment. In this embodiment, CWSK-F demodulation is repeated for multiple time bins. In demodulation mode, receiver 260 collects a frame of the CWSK-F/T data waveform (step 942). CWSK-F/T demodulator 265 multiplies a collected time-domain signal in a frame by a set of circularly time-shifted replicas associated with a range of time bins (steps 946 and 947). This replica multiplication produces a corresponding set of time bins. CWSK-F/T demodulator 265 then performs a Fast Fourier Transform on the set of time bins to produce a set of frequency bins (step 948). Receiver 260 then chooses the largest time and frequency bin to determine a CWSK-F/T encoded data symbol.

Figure 10:
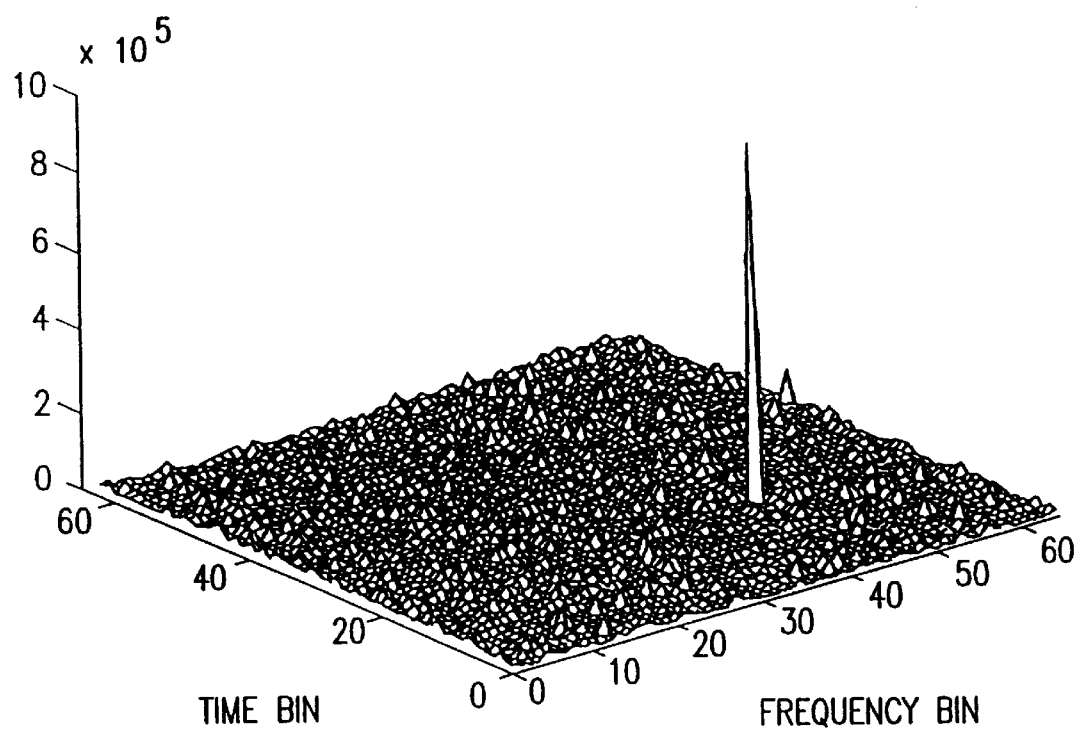
FIG. 10 is a diagram of two-dimensional processing output for time and frequency bins.

FIG. 10 is a diagram that illustrates two-dimensional processing output for time and frequency bins. This example is for a 12-bit CWSK F/T where there are 64 time bins by 64 frequency bins and corresponds to the demodulation of the CWSK-F/T waveform of FIG. 1C. The peak value at time bin 20, frequency bn 44 would be chosen and the CWSK demodulator output in a binary format would be 101100010100.

According to a feature of 2D CWSK demodulation, the receiver can be operated in CWSK-T/F or CWSK-F/T demodulation mode and tracking mode in parallel. The receiver can be switched to a track mode. Tracking measurements can be made based on demodulated data symbols with different tracking replicas to maintain a time window and to compensate for any frequency shift in frames being transmitted and received. Alternatively, a transmitter can transmit a spread spectrum 2D CWSK waveform having a known track symbol encoded by timeshifted and/or frequency-shifted circular-waveform shift-keying. 2D CWSK encoded track symbols are then demodulated like 2D CWSK encoded data symbols.

According to a further feature of the present invention, time-shifted and frequency-shifted circular-waveform shift-keying allows a spread spectrum receiver to be realized such that a synchronizing stage and a demodulator stage are implemented in software, firmware, hardware, and any combination thereof. In one example, a CWSK-T/F demodulator and a CWSK-F/T demodulator can be implemented primarily in software only with little or no change to existing hardware. In another example, a CWSK-T/F demodulator and a CWSK-F/T demodulator can be implemented primarily in one fast convolution ASIC at a receiver terminal for 2D CWSK demodulation and tracking.

The 2D CWSK receiver includes a fast convolution module and a controller for switching the fast convolution module between a synchronization mode and a demodulation mode for each spread spectrum channel. The fast convolution module is fabricated as a single fast convolution ASIC chip. In one example, the fast convolution ASIC chip includes a complex sample buffer, a complex replica buffer, a fast convolution processor, and a real convolution buffer. The fast convolution processor is a Fast Fourier Transform (FFT) processor. The fast convolution processor performs the following operations for CWSK-F/T demodulation: an N-point complex multiply, N-point complex FFT, and N-point complex magnitude squared. The fast convolution processor performs the following operations for CWSK-T/F demodulation: an N-point complex forward FFT, N-point complex multiply, N-point complex inverse FFT, and N-point complex magnitude squared.

In one example, a low-cost, high performance receiver is realized that uses a single fast convolution ASIC to process a spread spectrum channel. For example, CWSK-F/T demodulation can be performed for sixteen-bit CWSK-F/T encoded data symbols at a 2.4 kilobit/sec (kbps) data rate. The fast convolution ASIC can be operated in two modes, acquisition and demodulation. The acquisition mode at 1024-points is used for CWSK-F/T synchronization. The demodulation mode at 1024-points is used for CWSK-F/T demodulation.

Features and Advantages

CWSK spread spectrum communication is suitable for any asynchronous direct sequence spread spectrum channel. CWSK spread spectrum communication can also be used for communication and multiple access in synchronous systems where all spread spectrum users are using a same base waveform. CWSK is a type of orthogonal modulation like MFSK, and in spread spectrum applications is of an extremely high order (e.g., M≧256). This allows CWSK with noncoherent demodulation to provide performance comparable to coherent techniques with simpler, less costly implementation.

CWSK modulation and demodulation works with any direct sequence wide-bandwidth spread spectrum waveform. CWSK modulation is well suited for low rate voice and data communication. Synch symbols, data symbols, and tracking symbols can be encoded using CWSK modulation. CWSK demodulation can be implemented using fast convolution processing, shift registers, and parallel processing techniques. CWSK modulation is compatible with both time and frequency multiplexing.

Using CWSK modulation to convey data over a spread spectrum channel has several advantages. Due to the high order of the CWSK modulation and efficient use of the frequency bandwidth, the user capacity of the channel is increased compared to other non-coherent orthogonal modulations, such as, MFSK. The performance of CWSK is comparable to standard coherent phase-shifting techniques (PSK) and is simpler and less expensive to implement. For a large de-centralized network of uncoordinated users transmitting at low data rates, CWSK exceeds standard modulations in performance.

Another advantage of CWSK is the ability to be flexible in data rates. By transmitting K>1 simultaneous CWSK signals with the same timing, the data rate can be increased by up to a factor of integer K. The same demodulator for one CWSK signal can be used to demodulate the K simultaneous CWSK signals. In addition, the symbol bins can be subdivided to provide higher data rates. For example, the selection of one of 256 bins would normally convey the information of eight bins. Considering the 256 bins as four subsets of 64, a total of 4×6 bits=24 bits can be conveyed. This constitutes a factor of three increase in the data rate.

Further benefits of CWSK modulation in a hubless spread spectrum network are the ability to have a larger number of assigned codes and a lower probability of intercept due to the symbol-to-symbol shifting.

Example Performance Data

As described above, CWSK modulation and demodulation works with any direct sequence wide-bandwidth spread spectrum waveform. CWSK modulation is well suited for low rate voice and data communication in a hubless wireless network of multiple users. Compared to other noncoherent data modulation techniques, such as MSFK, CWSK modulation/demodulation provides improved performance, a smaller bandwidth penalty, and allows more assigned codes.

Figure 11A:
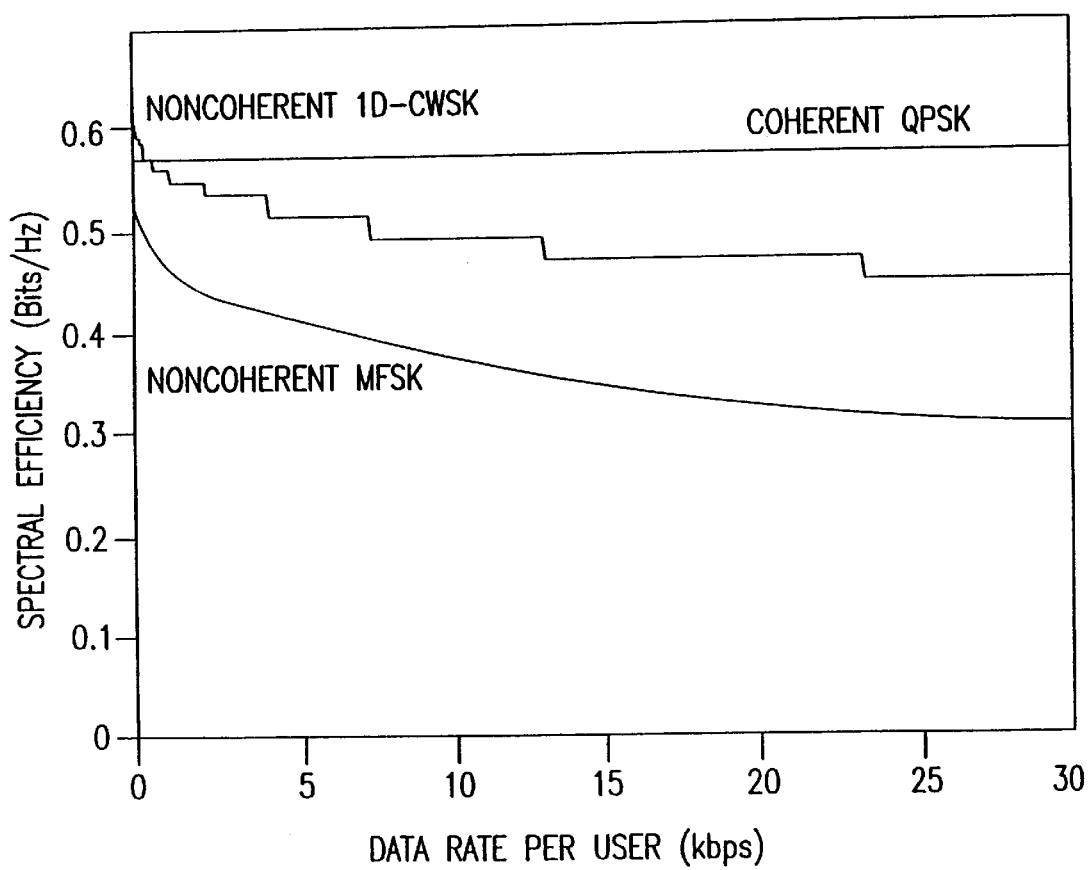
FIG. 11A is a diagram illustrating example performance comparison between one-dimensional CWSK data modulation and QPSK and MFSK data modulation techniques for high latency data.
Figure 11B:
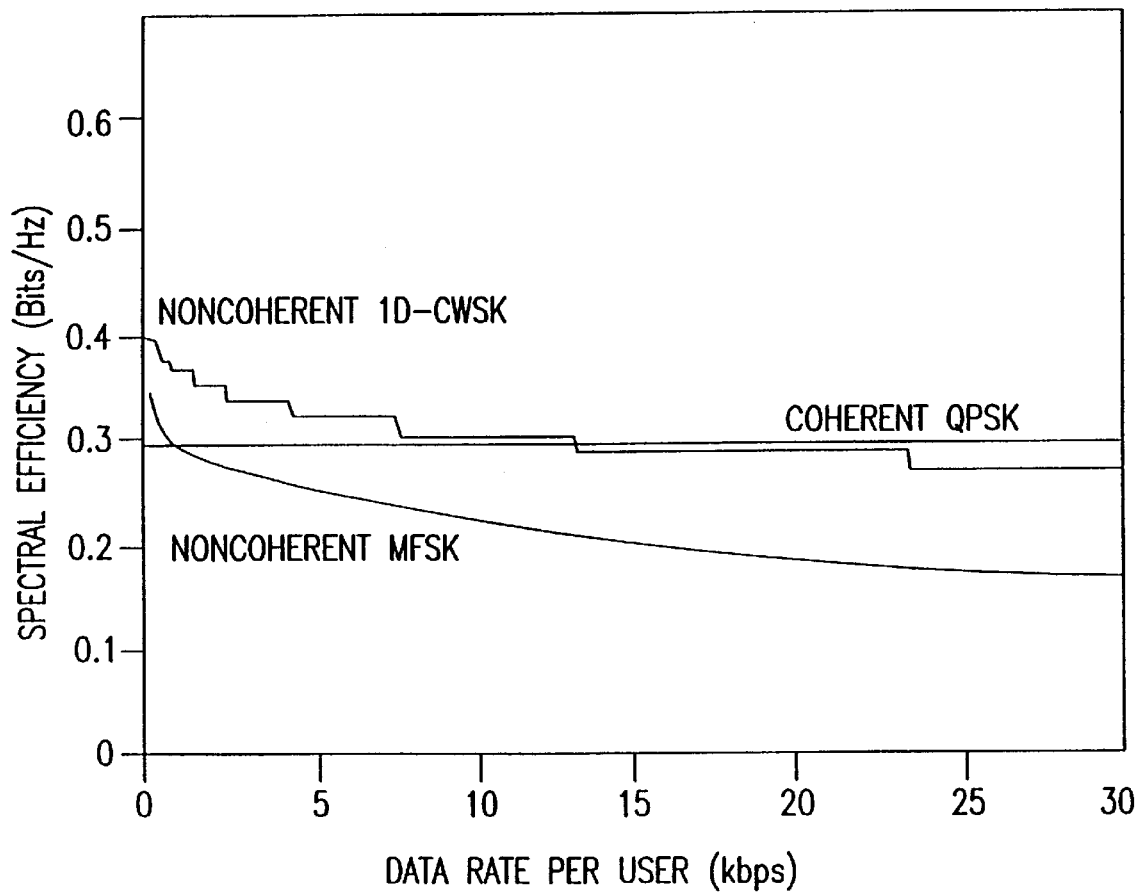
FIG. 11B is a diagram illustrating example performance comparison between one-dimensional CWSK data modulation and QPSK and MFSK data modulation techniques for low latency voice data.

FIG. 11A is a diagram illustrating example performance comparison between CWSK data modulation and QPSK and MFSK data modulation techniques for high latency data in the case of one-dimensional CWSK modulation (CWSK-T or CWSK-F). FIG. 11B is a diagram illustrating example performance comparison between CWSK data modulation and QPSK and MFSK data modulation techniques for low latency voice data in the case of one-dimensional CWSK modulation (CWSK-T or CWSK-F).

FIG. 11A shows a comparison between one-dimensional CWSK and two other modulation schemes. Coherent QPSK is the standard for data transmission over many wireless networks. Noncoherent MFSK is the typical orthogonal modulation method used in spread spectrum systems currently. In this comparison, the scenario is that the spread spectrum channel is carrying data traffic and therefore end-to-end delay is not critical.

Each of the three modulation techniques include powerful error correction with high latency. The coding for coherent QPSK is a concatenated code consisting of the standard K=7, rate ½ convolutional code and the standard (255,223)-Reed-Solomon code used in deep-space missions. This coding scheme is among the most powerful known to date. Both noncoherent techniques, one-dimensional CWSK and MFSK, use a (256,192)-Reed-Solomon error correction code with hard decisions, which is the optimum RS code for this application.

The graph shows the spectral efficiency of the spread spectrum channel for each of the three modulation schemes as a function of data rate. The channel is an interference-limited, asynchronous spread spectrum channel which is one megahertz in bandwidth and the desired output bit-error-rate after coding is one part in one million. Examination of the plots reveals that for low to medium data rates, one-dimensional CWSK yields a spectral efficiency close to the one of the best coherent modulations currently known. In the future, soft-decision decoding of RS codes or another coding technique may enable one-dimensional CWSK to even surpass coherent QPSK for this application. Noncoherent MFSK does not provide the same performance due to the wasted additional bandwidth allocated to the frequency shift-keying modulation which reduces the processing gain of the underlying spread spectrum waveform.

FIG. 11B shows a similar comparison for another scenario. In this instance, the channel is assumed to be carrying voice traffic which requires low end-to-end delay. The implication is that the long coding latencies of the above schemes cannot be tolerated and this occurs often in satellite networks where the round-trip transmission path to the satellite already is about ¼ second. To reduce the coding delay, the coding of the coherent QPSK modulation is by the K=7, rate ½ convolutional code alone and the coding of the two noncoherent techniques is by a short (14,10)-Reed-Solomon code. For this application, the one-dimensional CWSK is superior to the coherent modulation for low to medium data rates. In general, one-dimensional CWSK yields more efficient use of the channel for low data rate users which require minimal coding.

Figure 12A:
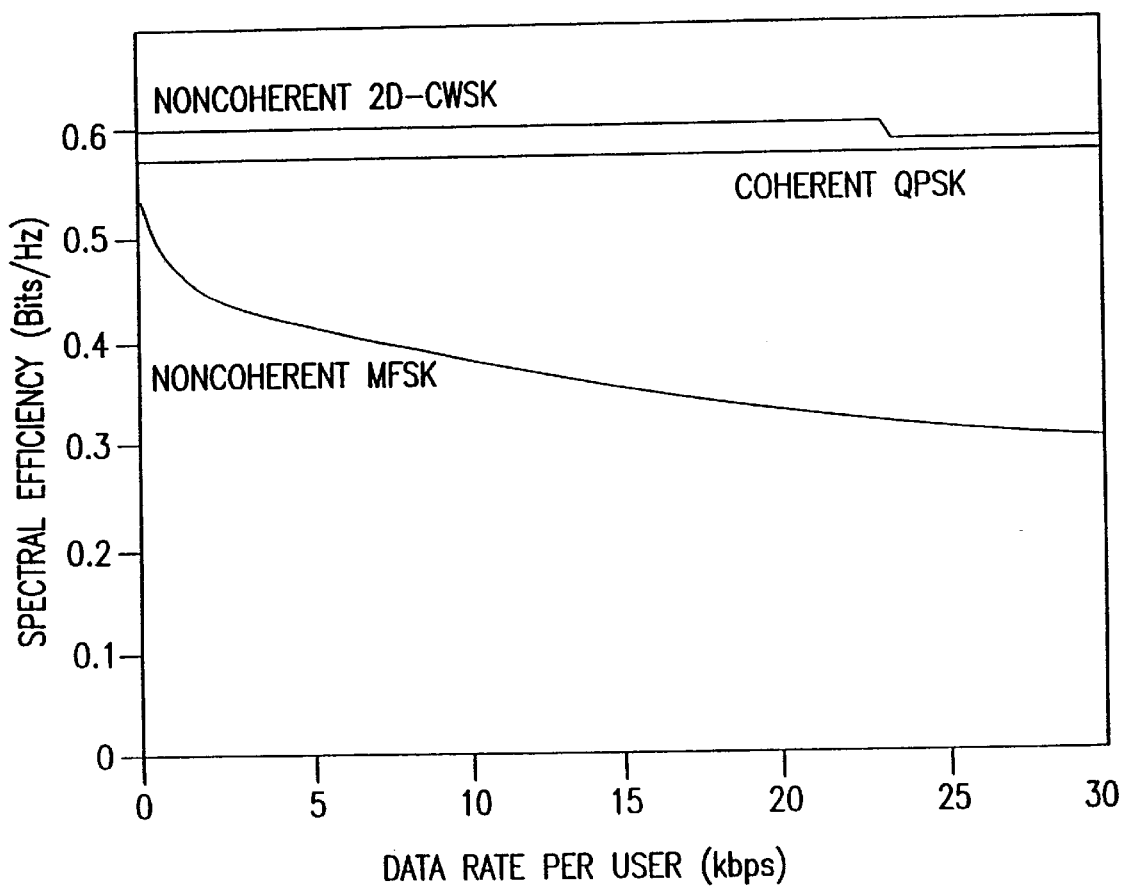
FIG. 12A is a diagram illustrating example performance comparison between two-dimensional CWSK data modulation and QPSK and MFSK data modulation techniques for high latency data.
Figure 12B:
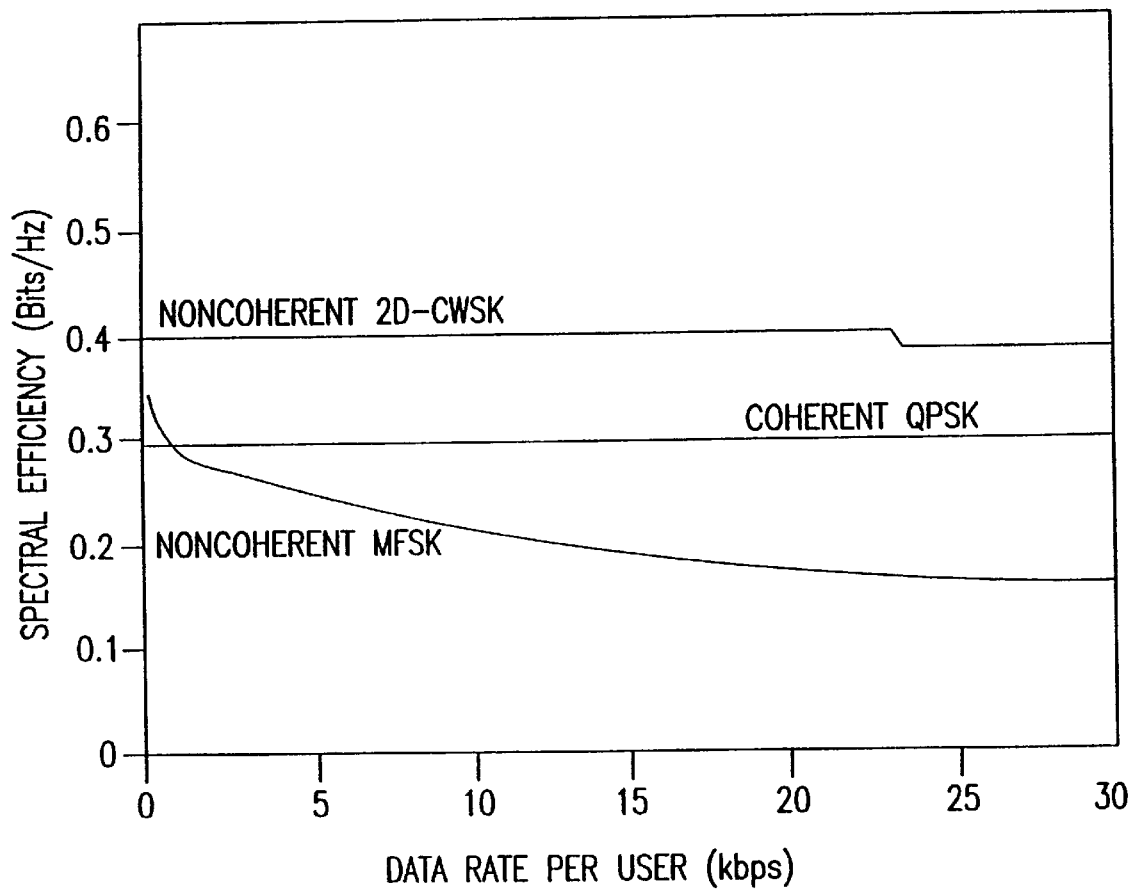
FIG. 12B is a diagram illustrating example performance comparison between two-dimensional CWSK data modulation and QPSK and MFSK data modulation techniques for low latency voice data.

FIG. 12A is a diagram illustrating example performance comparison between CWSK data modulation and QPSK and MFSK data modulation techniques for high latency data in the case of two-dimensional CWSK modulation (CWSK-T/F or CWSK-F/T). FIG. 12B is a diagram illustrating example performance comparison between CWSK data modulation and QPSK and MFSK data modulation techniques for low latency voice data in the case of two-dimensional CWSK modulation (CWSK-T/F or CWSK F/T).

FIG. 12A shows a comparison between two-dimensional CWSK and two other modulation schemes. Coherent QPSK is the standard for data transmission over many wireless networks. Noncoherent MFSK is the typical orthogonal modulation method used in spread spectrum systems currently. In this comparison, the scenario is that the spread spectrum channel is carrying data traffic and therefore end-to-end delay is not critical.

Each of the three modulation techniques include powerful error correction with high latency. The coding for coherent QPSK is a concatenated code consisting of the standard K=7, rate ½ convolutional code and the standard (255,223)-Reed-Solomon code used in deep-space missions. This coding scheme is among the most powerful known to date. Both noncoherent techniques, two-dimensional CWSK and MFSK, use a (256,192)-Reed-Solomon error correction code with hard decisions, which is the optimum RS code for this application.

The graph shows the spectral efficiency of the spread spectrum channel for each of the three modulation schemes as a function of data rate. The channel is an interference-limited, asynchronous spread spectrum channel which is one megahertz in bandwidth and the desired output bit-error-rate after coding is one part in one million. Examination of the plots reveals that for low to medium data rates, two-dimensional CWSK yields a spectral efficiency better than one of the best coherent modulations currently known. In the future, soft-decision decoding of RS codes or another coding technique may enable two-dimensional CWSK to further surpass coherent QPSK for this application. Noncoherent MFSK does not provide the same performance due to the wasted additional bandwidth allocated to the frequency shift-keying modulation which reduces the processing gain of the underlying spread spectrum waveform.

FIG. 12B shows a similar comparison for another scenario. In this instance, the channel is assumed to be carrying voice traffic which requires low end-to-end delay. The implication is that the long coding latencies of the above schemes cannot be tolerated and this occurs often in satellite networks where the round-trip transmission path to the satellite already is about ¼ second. To reduce the coding delay, the coding of the coherent QPSK modulation is by the K=7, rate ½ convolutional code alone and the coding of the two noncoherent techniques is by a short (14,10)-Reed-Solomon code. For this application, the two-dimensional CWSK is superior to the coherent modulation for all data rates.

Example GUI Computer Environment

Figure 13:
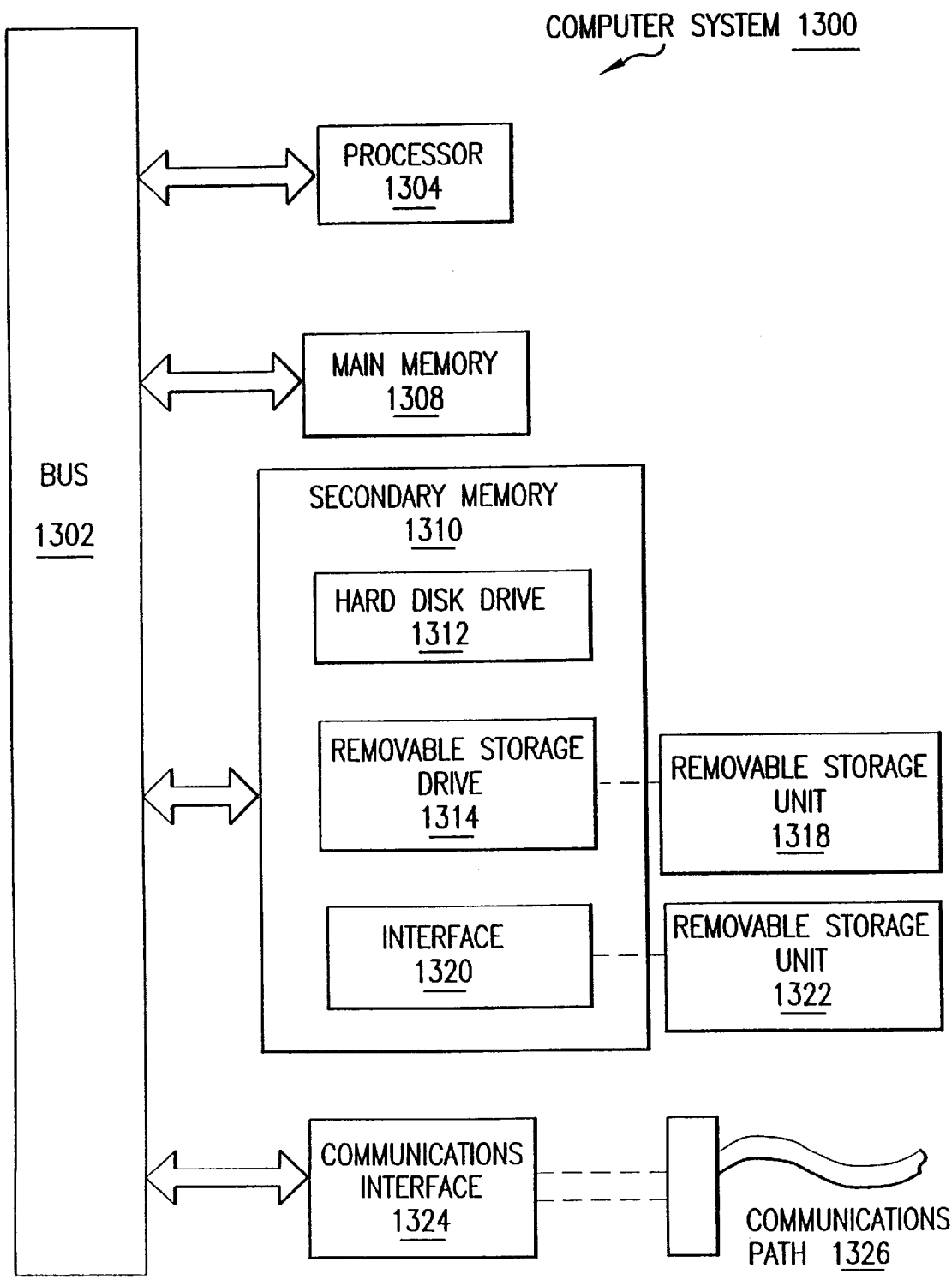
FIG. 13 is an example computer system for implementing the present invention.

FIG. 13 is a block diagram illustrating an example environment in which the present invention can operate. The environment is a computer system 1300 that includes one or more processors, such as processor 1304. The processor 1304 is connected to a communications bus 1302. Various software embodiments are described in terms of this example computer system. After reading this description, it will be apparent to a person skilled in the relevant art how to implement the invention using other computer systems and/or computer architectures.

Computer system 1300 also includes a main memory 1308, preferably random access memory (RAM), and can also include a secondary memory 1310. The secondary memory 1310 can include, for example, a hard disk drive 1312 and/or a removable storage drive 1314, representing a floppy disk drive, a magnetic tape drive, an optical disk drive, etc. The removable storage drive 1314 reads from and/or writes to a removable storage unit 1318 in a well known manner. Removable storage unit 1318 represents a floppy disk, magnetic tape, optical disk, etc., which is read by and written to by removable storage drive 1314. As will be appreciated, the removable storage unit 1318 includes a computer usable storage medium having stored therein computer software and/or data.

In alternative embodiments, secondary memory 1310 may include other similar means for allowing computer programs or other instructions to be loaded into computer system 1300. Such means can include, for example, a removable storage unit 1322 and an interface 1320. Examples can include a program cartridge and cartridge interface (such as that found in video game devices), a removable memory chip (such as an EPROM, or PROM) and associated socket, and other removable storage units 1322 and interfaces 1320 which allow software and data to be transferred from the removable storage unit 1322 to computer system 1300.

Computer system 1300 can also include a communications interface 1324. Communications interface 1324 allows software and data to be transferred between computer system 1300 and external devices via communications path 1326. Examples of communications interface 1324 can include a modem, a network interface (such as Ethernet card), a communications port, etc. Software and data transferred via communications interface 1324 are in the form of signals which can be electronic, electromagnetic, optical or other signals capable of being received by communications interface 1324, via communications path 1326. Note that communications interface 1324 provides a means by which computer system 1300 can interface to a network such as the Internet.

The present invention is described in terms of this example environment. Description in these terms is provided for convenience only. It is not intended that the invention be limited to application in this example environment. In fact, after reading the following description, it will become apparent to a person skilled in the relevant art how to implement the invention in alternative environments.

The present invention can be implemented using software running (that is, executing) in an environment similar to that described above with respect to FIG. 13. In this document, the term "computer program product" is used to generally refer to removable storage unit 1318 or a hard disk installed in hard disk drive 1312. These computer program products are means for providing software to computer system 1300.

Computer programs (also called computer control logic) are stored in main memory and/or secondary memory 1310. Computer programs can also be received via communications interface 1324. Such computer programs, when executed, enable the computer system 1300 to perform the features of the present invention as discussed herein. In particular, the computer programs, when executed, enable the processor 1304 to perform the features of the present invention. Accordingly, such computer programs represent controllers of the computer system 1300.

In an embodiment where the invention is implemented using software, the software may be stored in a computer program product and loaded into computer system 1300 using removable storage drive 1314, hard drive 1312, or communications interface 1324. Alternatively, the computer program product may be downloaded to computer system 1300 over communications path 1326. The control logic (software), when executed by the processor 1304, causes the processor 1304 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for communicating over at least one spread spectrum channel between transmitter and receiver terminals in a wireless network, comprising the steps of:
   transmitting a synchronization waveform;
   synchronizing the receiver terminal to said synchronization waveform;
   transmitting a spread spectrum CWSK data waveform having data encoded by circular-waveform shift-keying, such that a data symbol is encoded in a frame by at least one of a circular time-shift and a circular frequency-shift of a spread spectrum waveform within the frame; and
   demodulating said spread spectrum CWSK data waveform at the receiver terminal to extract said data; and wherein
   said synchronization waveform transmitting step transmits a spread spectrum CWSK waveform having a synch symbol encoded by circular-waveform shift-keying, such that a synch symbol is encoded in a frame by at least one of a circular time-shift and a circular frequency-shift of a spread spectrum waveform within the frame.

2. The method of claim 1, wherein said synchronizing step performs at least one convolution operation between a frame in said transmitted spread spectrum CWSK waveform and a stored replica of a frame of said transmitted spread spectrum CWSK waveform to detect a convolution peak corresponding to said synch symbol, wherein the receiver terminal is asynchronously synchronized with a frame subsequently transmitted in said spread spectrum CWSK data waveform based on said synch symbol.

3. The method of claim 1, wherein said synchronizing step includes the following steps of:
   collecting N consecutive frames transmitted in said transmitted spread spectrum CWSK waveform, where N is an integer;
   performing N fast convolutions between said N frames and a stored replica of a frame of said transmitted spread spectrum CWSK waveform to detect N convolution peaks;
   integrating said N detected convolution peaks and outputting an output signal representative thereof, and
   applying a CFAR threshold criterion to detect when said output signal exceeds a predetermined threshold; wherein the receiver terminal is asynchronously synchronized with a frame subsequently transmitted in said spread spectrum CWSK data waveform based on said synch symbol.

4. The method of claim 1, wherein said demodulating step performs at least one convolution operation between a frame in said transmitted spread spectrum CWSK data waveform and a stored replica of a frame of said transmitted spread spectrum CWSK waveform to detect a location of a convolution peak within a frame, said convolution peak location representing said data symbol in said frame.

5. The method of claim 1, wherein said demodulating step includes the following steps of:
   collecting a frame of said spread spectrum CWSK data waveform;
   performing a Fast Fourier Transform on said collected frame to obtain a frequency-domain signal representative of said spread spectrum CWSK data waveform frame;

multiplying said frequency-domain signal with a replica spectrum, said replica spectrum representing a Fast Fourier Transform of a time-domain replica of a frame of said transmitted spread spectrum CWSK waveform, and outputting a product output signal representative of said multiplying; and performing an inverse Fast Fourier Transform on said product output signal to obtain a time-domain signal representative of a time bin indicative of said data symbol in said collected frame.

6. The method of claim 1, further comprising the steps of: transmitting a spread spectrum CWSK waveform having a track symbol encoded by circular-waveform shift-keying, such that a track symbol is encoded in a frame by at least one of a circular time-shift and a circular frequency-shift of a spread spectrum waveform within the frame.

7. The method of claim 6, wherein said demodulating step performs at least one convolution operation between a frame in said transmitted spread spectrum CWSK waveform and a stored replica of a frame of said transmitted spread spectrum CWSK waveform to detect a convolution peak corresponding to said track symbol, whereby the receiver terminal can maintain a time window and compensate for a frequency shift in frames subsequently transmitted in said spread spectrum CWSK data waveform based on said track symbol.

8. The method of claim 1, wherein said at least one spread spectrum channel comprises a plurality of spread spectrum channels for carrying multiple calls, and wherein said synchronizing step and said demodulating step are performed for each spread spectrum channel to process said multiple calls at approximately the same time.

9. The method of claim 1, wherein said synchronizing step and said demodulating step are performed using a single integrated chip.

10. The method of claim 1, wherein said demodulating step includes the following steps of:

collecting a frame of said spread spectrum CWSK data waveform;

multiplying a time-domain signal in said frame by a replica and outputting a product output signal representative of said multiplying; and performing a Fast Fourier Transform on said product output signal to obtain a frequency-domain signal representative of a frequency bin indicative of said data symbol in said collected frame.

11. The method of claim 1, wherein said demodulating step includes the following steps of:

collecting a frame of said spread spectrum CWSK data waveform;

performing a Fast Fourier Transform on said collected frame to obtain a frequency-domain signal representative of said spread spectrum CWSK data waveform in said collected frame;

multiplying said frequency-domain signal by a set of circularly-shifted replica spectrums and outputting a set of frequency bins representative of said multiplying; and performing an inverse Fast Fourier Transform on said product output signal to obtain a set of time bins indicative of said data symbol in said collected frame.

12. The method of claim 1, wherein said demodulating step includes the following steps of:

collecting a frame of said spread spectrum CWSK data waveform;

multiplying a time-domain signal in said frame by a set of circularly time-shifted replicas and outputting a set of corresponding time bins representative of said multiplying; and performing a Fast Fourier Transform on said set of time bins to obtain a set of frequency bins indicative of said data symbol in said collected frame.

13. A system for communicating over at least one spread spectrum channel between transmitter and receiver terminals in a wireless network, comprising:

a transmitter; and a receiver; wherein, said transmitter transmits a synchronization waveform and a spread spectrum CWSK data waveform from the transmitter terminal, said spread spectrum CWSK data waveform having data encoded by circular-waveform shift-keying, such that a data symbol is encoded in a frame by at least one of a circular time-shift and a circular frequency-shift of a spread spectrum waveform within said frame; and said receiver synchronizes the receiver terminal to said synchronization waveform and demodulates said spread spectrum CWSK data waveform at the receiver terminal to extract said data; and wherein said transmitter transmits a spread spectrum CWSK synch waveform having a synch symbol encoded by circular-waveform shift-keying, such that a synch symbol is encoded in a frame by at least one of circular time-shift and a circular frequency-shift of a spread spectrum waveform within the frame.

14. The system of claim 13, wherein said receiver performs at least one convolution operation between a frame in said transmitted spread spectrum CWSK synch waveform and a stored replica of a frame of said transmitted spread spectrum CWSK waveform to detect a convolution peak corresponding to said synch symbol, whereby the receiver terminal can be asynchronously synchronized with a frame subsequently transmitted in said spread spectrum CWSK data waveform based on said synch symbol.

15. The system of claim 13, wherein said receiver includes a synchronization stage which collects N consecutive frames transmitted in said transmitted spread spectrum CWSK waveform, where N is an integer, performs N fast convolutions between said N frames and a stored replica of a frame of said transmitted spread spectrum CWSK waveform to detect N convolution peaks, integrates said N detected convolution peaks and outputs an output signal representative thereof, and applies a CFAR threshold criterion to detect when said output signal exceeds a predetermined threshold, wherein the receiver terminal is asynchronously synchronized with a frame subsequently transmitted in said spread spectrum CWSK data waveform based on said synch symbol.

16. The system of claim 13, wherein said receiver comprises:

a demodulator that performs at least one convolution operation between a frame in said transmitted spread spectrum CWSK data waveform and a stored replica of a frame of said transmitted spread spectrum CWSK waveform to detect a location of a convolution peak within a frame, said convolution peak location representing said data symbol in said frame.

17. The system of claim 13, wherein said receiver includes a demodulator which collects a frame of said spread spectrum CWSK data waveform, performs a Fast Fourier Transform on said collected frame to obtain a frequency-domain signal representative of said spread spectrum CWSK data waveform frame, multiplies said frequency-domain signal with a replica spectrum, said replica spectrum representing a Fast Fourier Transform of a time-domain replica of a frame of said transmitted spread spectrum CWSK waveform, and outputting a product output signal representative of said multiplying, and performs an inverse Fast Fourier Transform on said product output signal to obtain a time-domain signal representative of a time bin indicative of said data symbol in said collected frame.

18. The system of claim 13, wherein said transmitter further transmits a spread spectrum CWSK waveform having a track symbol encoded by circular-waveform shift-keying, such that a track symbol is encoded in a frame by at least one of a circular time-shift and a circular frequency-shift of a spread spectrum waveform within the frame.

19. The system of claim 18, wherein said receiver includes a demodulator that performs at least one convolution operation between a frame in said transmitted spread spectrum CWSK waveform and a stored replica of a frame of said transmitted spread spectrum CWSK waveform to detect a convolution peak corresponding to said track symbol, whereby the receiver terminal can maintain a time window and compensate for a frequency shift in frames subsequently transmitted in said spread spectrum CWSK data waveform based on said track symbol.

20. The system of claim 13, wherein said at least one spread spectrum channel comprises a plurality of spread spectrum channels for carrying multiple calls, and said receiver processes said multiple calls at approximately the same time.

21. The system of claim 13, wherein said receiver includes a synchronizing stage and a demodulator stage implemented on a single integrated chip.

22. The system of claim 13, wherein said receiver comprises:
   a fast convolution module; and
   a controller for switching said fast convolution module between a synchronization mode and a demodulation mode for each spread spectrum channel.

23. The system of claim 22, wherein said fast convolution module comprises a single chip that includes:
   a sample buffer;
   a replica buffer;
   a fast convolution processor; and
   convolution buffer.

24. A method in accordance with claim 1 wherein:
   the spread spectrum CWSK data waveform is an analog waveform.

25. A system in accordance with claim 13 wherein:
   the spread spectrum CWSK data waveform is an analog waveform.

26. A method for communicating over at least one spread spectrum channel between transmitter and receiver terminals in a wireless network, comprising the steps of:
   transmitting a synchronization waveform;
   synchronizing the receiver terminal to said synchronization waveform;
   transmitting a spread spectrum CWSK-F data waveform having data encoded by circular-waveform shift-keying, such that a data symbol is encoded in a frame by a circular time-shift and a circular frequency-shift of a spread spectrum waveform within the frame; and
   demodulating said spread spectrum CWSK-F waveform at the receiver terminal to extract said data.

27. A method in accordance with claim 26 wherein:
   the spread spectrum CWSK-F data waveform is an analog waveform.

28. A method for communicating over at least one spread spectrum channel between transmitter and receiver terminals in a wireless network, comprising the steps of:
   transmitting a synchronization waveform;
   synchronizing the receiver terminal to said synchronization waveform;
   transmitting a spread spectrum CWSK-T/F data waveform having data encoded by circular-waveform shift-keying, such that a data symbol is encoded in a frame by a combination of a circular time-shift and a circular frequency-shift of a spread spectrum waveform within the frame; and
   demodulating said spread spectrum CWSK-T/F data waveform at the receiver terminal to extract said data.

29. A method in accordance with claim 28 wherein:
   the spread spectrum CWSK-T/F data waveform is an analog waveform.

30. A method for communicating over at least one spread spectrum channel between transmitter and receiver terminals in a wireless network, comprising the steps of:
   transmitting a synchronization waveform;
   synchronizing the receiver terminal to said synchronization waveform;
   transmitting a spread spectrum CWSK-F/T data waveform having data encoded by circular-waveform shift-keying, such that a data symbol is encoded in a frame by a combination of a circular time-shift and a circular frequency-shift of a spread spectrum waveform within the frame; and
   demodulating said spread spectrum CWSK-F/T waveform at the receiver terminal to extract said data.

31. A method in accordance with claim 30 wherein:
   the spread spectrum CWSK-F/T data waveform is an analog waveform.

32. A system for communicating over at least one spread spectrum channel between transmitter and receiver terminals in a wireless network, comprising:
   a transmitter; and
   a receiver; wherein,
      said transmitter transmits a synchronization waveform and a spread spectrum CWSK-F data waveform from the transmitter terminal, said spread spectrum CWSK-F data waveform having data encoded by circular-waveform shift-keying, such that a data symbol is encoded in a frame by a circular frequency-shift of a spread spectrum waveform within said frame, and
      said receiver synchronizes the receiver terminal to said synchronization waveform and demodulates said spread spectrum CWSK-F data waveform at the receiver terminal to extract said data.

33. A system in accordance with claim 32 wherein:
   the spread spectrum CWSK-F data waveform is an analog waveform.

34. A system for communicating over at least one spread spectrum channel between transmitter and receiver terminals in a wireless network, comprising:
   a transmitter; and
   a receiver; wherein,
      said transmitter transmits a synchronization waveform and a spread spectrum CWSK-T/F data waveform from the transmitter terminal, said spread spectrum CWSK-T/F data waveform having data encoded by circular-waveform shift-keying, such that a data symbol is encoded in a frame by a combination of a circular time-shift and a circular frequency-shift of a spread spectrum waveform within said frame, and said receiver synchronizes the receiver terminal to said synchronization waveform and demodulates said spread spectrum CWSK-T/F data waveform at the receiver terminal to extract said data.

35. A system in accordance with claim 32 wherein:
the spread spectrum CWSK-T/F data waveform is an analog waveform.

36. A system for communicating over at least one spread spectrum channel between transmitter and receiver terminals in a wireless network, comprising:
a transmitter; and
a receiver; wherein,
said transmitter transmits a synchronization waveform and a spread spectrum CWSK-F/T waveform from the transmitter terminal, said spread spectrum CWSK-F/T waveform having data encoded by circular-waveform shift-keying, such that a data symbol is encoded in a frame by a combination circular time-shift and a circular frequency-shift of a spread spectrum waveform within said frame, and
said receiver synchronizes the receiver terminal to said synchronization waveform and demodulates said spread spectrum CWSK-F/T data waveform at the receiver terminal to extract said data.

37. A system in accordance with claim 36 wherein:
the spread spectrum CWSK-F/T data waveform is an analog waveform.

38. A method for communicating over at least one spread spectrum channel between transmitter and receiver terminals in a wireless network, comprising the steps of:
transmitting a synchronization waveform;
synchronizing the receiver terminal to said synchronization waveform; and wherein
said synchronization waveform transmitting step transmits a spread spectrum CWSK waveform having a synch symbol encoded by circular-waveform shift-keying, such that the synch symbol is encoded in a frame by at least one of a circular time-shift and a circular frequency-shift of a spread spectrum waveform within the frame.

39. A method in accordance with claim 38 wherein:
the spread spectrum CWSK data waveform is an analog waveform.

40. The method of claim 38 further comprising:
transmitting a spread spectrum CWSK waveform; and
a receiver terminal is asynchronously synchronized with a frame subsequently transmitted in said spectrum CWSK data waveform based on said synch symbol; and wherein
said synchronizing step performs at least one convolution operation between a frame in said transmitted spread spectrum CWSK waveform and a stored replica of a frame of said transmitted spread spectrum CWSK waveform to detect a convolution peak corresponding to said synch symbol.

41. The method of claim 38, wherein said synchronizing step includes the following steps of:
collecting N consecutive frames transmitted in said transmitted spread spectrum CWSK waveform, where N is an integer;
performing N fast convolutions between said N frames and a stored replica of a frame of said transmitted spread spectrum CWSK waveform to detect N convolution peaks;
integrating said N detected convolution peaks and outputting an output signal representative thereof; and
applying a CFAR threshold criterion to detect when said output signal exceeds a predetermined threshold; wherein the receiver terminal is asynchronously synchronized with a frame subsequently transmitted in said spread spectrum CWSK data waveform based on said synch symbol.

42. A system for communicating over at least one spread spectrum channel between transmitter and receiver terminals in a wireless network, comprising:
a transmitter; and
a receiver; wherein,
said transmitter transmits a synchronization waveform; and
said transmitter transmits a spread spectrum CWSK synch waveform having a synch symbol encoded by circular-waveform shift-keying, such that a synch symbol is encoded in a frame by at least one of a circular time-shift and a circular frequency-shift of a spread spectrum waveform within the frame.

43. A system in accordance with claim 42 wherein:
the spread spectrum CWSK data waveform is an analog waveform.

44. The system of claim 42, wherein:
said receiver performs at least one convolution operation between a frame in said transmitted spread spectrum CWSK synch waveform and a stored replica of a frame of said transmitted spread spectrum CWSK waveform to detect a convolution peak corresponding to said synch symbol, whereby the receiver terminal can be asynchronously synchronized with a frame subsequently transmitted in said spread spectrum CWSK data waveform based on said synch symbol.

45. The system of claim 42, wherein:
said receiver includes a synchronization stage which collects N consecutive frames transmitted in said transmitted spread spectrum CWSK waveform, where N is an integer, performs N fast convolutions between said N frames and a stored replica of a frame of said transmitted spread spectrum CWSK waveform to detect N convolution peaks, integrates said N detected convolution peaks and outputting an output signal representative thereof, and applies a CFAR threshold criterion to detect when said output signal exceeds a predetermined threshold; wherein the receiver terminal is asynchronously synchronized with a frame subsequently transmitted in said spread spectrum CWSK data waveform based on said synch symbol.

46. A method for communicating over at least one spread spectrum channel between transmitter and receiver terminals in a wireless network, comprising the steps of:
transmitting a spread spectrum CWSK data waveform having data encoded by circular-waveform shift-keying, such that a data symbol is encoded in a frame by at least one of a circular time-shift and a circular frequency-shift of a spread spectrum waveform within the frame; and
demodulating said spread spectrum CWSK data waveform at the receiver terminal to extract said data; and
transmitting a spread spectrum CWSK waveform having a track symbol encoded by circular-waveform shift-keying, such that a track symbol is encoded in a frame by at least one of a circular time-shift and a circular frequency-shift of a spread spectrum waveform within the frame.

47. A method in accordance with claim 46 wherein:

the spread spectrum CWSK data waveform is an analog waveform.

48. The method of claim 46, wherein said demodulating step performs at least one convolution operation between a frame in said transmitted spread spectrum CWSK waveform and a stored replica of a frame of said transmitted spread spectrum CWSK waveform to detect a convolution peak corresponding to said track symbol, whereby the receiver terminal can maintain a time window and compensate for a frequency shift in frames subsequently transmitted in said spread spectrum CWSK data waveform based on said track symbol.

49. A system for communicating over at least one spread spectrum channel between transmitter and receiver terminals in a wireless network wherein:

the transmitter terminal transmits to the receiver terminal a spread spectrum CWSK waveform having a track symbol encoded by circular-waveform shift-keying, such that a track symbol is encoded in a frame by at least one of a circular time-shift and a circular frequency-shift of a spread spectrum waveform within said frame.

50. A system in accordance with claim 49 wherein:

the spread spectrum CWSK data waveform is an analog waveform.

51. The system of claim 49, wherein:

said receiver terminal includes a demodulator that performs at least one convolution operation between a frame in said transmitted spread spectrum CWSK waveform and a stored replica of a frame of said transmitted spread spectrum CWSK waveform to detect a convolution peak corresponding to said track symbol, whereby the receiver terminal can maintain a time window and compensate for a frequency shift in frames subsequently transmitted in said spread spectrum CWSK data waveform based on said track symbol.

52. A method for communicating over at least one spread spectrum channel between transmitter and receiver terminals in a wireless network, comprising the steps of:

transmitting a synchronization waveform;

synchronizing the receiver terminal to said synchronization waveform;

transmitting a spread spectrum analog CWSK data waveform having data encoded by circular-waveform shift-keying, such that a data symbol is encoded in a frame by at least one of a circular time-shift and a circular frequency-shift of a spread spectrum waveform within the frame; and demodulating said spread spectrum analog CWSK data waveform at the receiver terminal to extract said data.

53. A system for communicating over at least one spread spectrum channel between transmitter and receiver terminals in a wireless network, comprising:

a transmitter; and a receiver; wherein, said transmitter transmits a synchronization waveform and a spread spectrum analog CWSK data waveform from the transmitter terminal, said spread spectrum CWSK-F data waveform having data encoded by circular-waveform shift-keying, such that a data symbol is encoded in a frame by at least one of a circular time-shift and a circular frequency-shift of a spread spectrum waveform within said frame, and said receiver synchronizes the receiver terminal to said synchronization waveform and demodulates said spread spectrum analog CWSK data waveform at the receiver terminal to extract said data.

* * * * *